United States Patent [19]
Nagasaka et al.

[11] Patent Number: 6,039,029
[45] Date of Patent: Mar. 21, 2000

[54] INDUCTION SYSTEM FOR FUEL INJECTED ENGINE

[75] Inventors: Hideaki Nagasaka; Haruhiko Samoto; Yoshinobu Yashiro; Yoshiyuki Higaki, all of Iwata, Japan

[73] Assignee: Yamaha Hatsudoki Kabushiki Kaisha, Iwata, Japan

[21] Appl. No.: 09/049,337

[22] Filed: Mar. 27, 1998

[30] Foreign Application Priority Data

| Mar. 27, 1997 | [JP] | Japan | 9-075819 |
| May 30, 1997 | [JP] | Japan | 9-142313 |
| Jul. 3, 1997 | [JP] | Japan | 9-178510 |
| Jul. 14, 1997 | [JP] | Japan | 9-188143 |

[51] Int. Cl.$^7$ .......................... F02B 31/06; F02M 57/00
[52] U.S. Cl. .......................... 123/442; 123/470; 123/336
[58] Field of Search .......................... 123/442, 494, 123/470, 336, 308

[56] References Cited

U.S. PATENT DOCUMENTS

| 4,768,486 | 9/1988 | Koike et al. | 123/442 |
| 5,205,244 | 4/1993 | Nakamura et al. | 123/52 MC |
| 5,477,823 | 12/1995 | Uchida | 123/308 |
| 5,852,994 | 12/1998 | Tsuzuku et al. | 123/308 |

*Primary Examiner*—Tony M. Argenbright
*Assistant Examiner*—Arnold Castro
*Attorney, Agent, or Firm*—Knobbe, Martens, Olson & Bear LLP

[57] ABSTRACT

A number of embodiments of engine induction system and fuel injection systems for increasing the engines combustion efficiency by maintaining a desired ratio between the intake system volume between the throttle valve and the intake port and the exhaust gas volume. This requires a close positioning of the throttle valve to the combustion chamber, and thus results in quick throttle response. A fuel injection system injects fuel into the intake passage, and a number of embodiments of buffer valves are employed so as to maintain stability in combustion when blipping the throttle under no-load conditions. In addition, arrangements are disclosed wherein separate throttle bodies are employed but that utilize the fuel rail as a means for connecting all of these throttle bodies together to provide a unitary sub-assembly. In addition, an improved throttle position sensor and associated controls are mounted in close proximity to each other on the throttle bodies in many of the embodiments in order to reduce external wiring and improve signal transmission. In addition, the control system employs an arrangement for compensating for a non-linearity in the output of the throttle position sensor.

72 Claims, 30 Drawing Sheets

INDUCTION SYSTEM FOR FUEL INJECTED ENGINE

BACKGROUND OF THE INVENTION

This invention relates to an induction system for a fuel-injected engine and more particularly to a control and the physical relationship of the components of such an induction system and engine.

It has been recognized that the performance of an engine can be significantly improved if the volume of the induction passage between the throttle valve and the intake port is correctly proportioned relative to the total volume displaced in the combustion chamber including the clearance volume. This latter volume is referred to as the "exhaust gas volume per cylinder". If this ratio is kept quite small, for example in the range of 0.15 to 0.45, performance can be significantly improved. Such arrangements are disclosed in the co-pending applications both entitled "Engine Having Combustion Control System", Ser. Nos. 09/016,199 and 09/025,064, filed Jan. 30,1998 and Feb. 1,1998, respectively, and assigned to the assignee hereof. With this type of arrangement, the resulting construction places the throttle valve quite close to the intake port. This gives rise to certain problems including some of those mentioned and overcome in the aforenoted co-pending applications. However, there are still other problems that exist.

Because of the close location of the throttle valve to the intake port, when intake air volume is increased rapidly, the air fuel ratio may be disturbed and cause poor firing and combustion in the combustion chamber. This is partially a result of the fact that the fuel flow amount does not increase as rapidly as the air flow amount due to its relatively greater inertia. This problem is what causes carbureted engines to utilize accelerating pumps. Such a concept is somewhat more difficult to embody in a fuel-injected engine.

This running condition frequently happens when racing the engine or what is called "blipping the throttle" occurs when operating under low or no-load conditions in order to clear the engine and keep it running smoothly.

It is, therefore, a principal object of this invention to provide an improved arrangement for controlling the air flow through an induction system so as to permit smooth running and proper air fuel ratio, particularly during such conditions as blipping the throttle.

The use of fuel injection to provide more accurate control over the fuel air ratio, particularly on a cycle-to-cycle basis, is well-known. For a wide variety of reasons, injection into the induction system rather than directly into the combustion chamber may be more desirable. In addition to the problem previously noted, however, manifold injection causes a possibility of fuel being deposited on the walls of the intake passage. Although this fuel will eventually be distributed into the combustion chamber, the timing of the actual fuel introduction into the combustion chamber from the deposits on the intake passage wall is somewhat erratic and can cause uneven running.

The fuel that is deposited on the intake passage walls also is not swept away as rapidly as fuel deposited in other areas in the intake passage due to the laminar flow condition that exists on the peripheral surfaces of the intake passage.

It is, therefore, a still further object of this invention to provide an improved manifold arrangement system for an engine wherein any fuel that is deposited during the induction cycle is deposited in areas where the air flow will be greater and the fuel will be more likely to be swept into the combustion chamber on the cycle for which it was intended.

With engines embodying this technique of appropriately relating the induction system volume with the exhaust gas volume, it is substantially necessary to employ individual throttle valves for each intake port. This requires a complicated linkage system and in some applications, presents problems with placement of all of the components of the engine particularly with space that may be available.

It is, therefore, a still further object of this invention to provide an improved layout for the components of the engine and fuel injection system of a fuel-injected multi-cylinder internal combustion engine.

As an example of the components that are employed with a fuel injection system, generally the injection system for a multiple cylinder engine embodies a fuel rail that supplies fuel to a group of fuel injectors. In addition, it is generally the practice to control the pressure in the fuel supply system so that the fuel is supplied at the desired pressure ratio relative to the intake air with which it is mixed. This requires the use of pressure regulators and return conduits. In addition, the fuel supply system includes other components such as filters and the like. These components all take up space and in some instances, it is desirable to maintain the components as close to each other as possible so as to reduce pressure losses and the like.

It is, therefore, a still further object of this invention to provide an improved fuel supply system for a multiple cylinder fuel injected engine.

It is yet a further object of this invention to provide an improved combined fuel rail, pressure regulator and fuel filter arrangement for such engines.

In conjunction with the control systems for engine management including management of the fuel injection system, there are frequently employed sensors for sensing varying engine conditions. One sensor almost universally employed in the system is a throttle position sensor. This sensor senses the position of the throttle valve and thus provide an indication of load and/or operator demand for the control strategy.

Where the engine has plural throttle valves and at times this incorporates the use of plural throttle bodies, the positioning of the sensor can present significant difficulties, as is noted in the aforenoted co-pending application. In addition to the positional mounting problem, there is also the problem of transmitting the signal from the sensor to the control unit. This requires the use of wire transmitters and/or wire harnesses and can present some problem.

It is, therefore, a still further object of this invention to provide a more integrated throttle position sensor and control unit for engine management system.

In connection with the utilization of throttle position sensors, in order to obtain the high accuracy required for providing accurate signals, the sensor can become quite expensive. This can significantly add to the cost of the engine and even if accurate sensors are employed, the signals may not always be as accurate as desired.

It is, therefore, a still further object of this invention to provide an improved sensor and control arrangement wherein lower cost sensors can be utilized without sacrificing accuracy.

As has been noted, the use of these concepts with multiple cylinder engines frequently dictates the use of multiple throttle bodies for the engine. Although a single throttle body could be utilized for multiple cylinders, this presents certain problems in connection with alignment, attachment and accessibility. Therefore, frequently separate throttle bodies are employed. Where separate throttle bodies are employed, however, then movement or misalignment between the throttle bodies can cause binding in the throttle linkage and other problems.

It is, therefore, a still further object of this invention to provide an improved throttle body fuel injection system for a multiple cylinder engine wherein independent components can be utilized but wherein the components are attached in such a way to provide a rigid overall structure without having it be unitary in nature.

SUMMARY OF THE INVENTION

A first feature of the invention is adapted to be embodied in an induction system for an internal combustion engine having at least a pair of relatively movable components that define a combustion chamber. An induction system is provided for supplying a charge to the combustion chamber. This induction system forms an intake passage in which a throttle valve is positioned and which intake passage communicates with the combustion chamber through an intake port. The throttle valve is positioned in close proximity to the intake port. A fuel injector injects fuel directly into the intake passage. A buffer valve is provided in the intake passage and which is opened by the flow therethrough for restricting the air flow upon sudden changes in position in the throttle valve so as to maintain a more uniform air fuel ratio under transient condition.

Another feature of the invention is adapted to be embodied in an induction system of the type described in the preceding paragraph, but not necessarily employing the buffer valve. With such an arrangement, the fuel injector is positioned to spray fuel into the intake passage so that the sprayed fuel will impinge upon a member that is movable within the intake passage and which is spaced in part inwardly from the outer peripheral wall of the intake passage. In this way, any fuel that is deposited on this member will be easily swept by the air flow into the combustion chamber on the cycle for which it is intended.

Other features of the invention is adapted to be embodied in an internal combustion engine having a plurality of chambers. A plurality of intake passages are provided, each of which serves at least one of the combustion chambers. Fuel injectors are mounted on the intake passages and spray the fuel directly into them. These intake passages are formed by separate throttle bodies in which the flow controlling throttle valves are supported. A fuel rail supplies fuel to the fuel injectors.

In accordance with one facet of the other features of the invention, a pressure regulator is carried at one end of the fuel rail and a fuel filter is provided at the other end of the fuel rail.

In accordance with another facet of this other feature of the invention, the fuel rail is rigidly affixed to the fuel injectors and to the throttle bodies so as to provide a unitary assembly of these separate pieces.

In accordance with a still further facet of this other feature of the invention, a throttle position sensor is associated with one of the throttle valve shafts of one of the throttle bodies. This throttle position sensor outputs a signal to a control unit for engine management that is also mounted on the throttle bodies.

In accordance with a still further feature of the invention having a throttle position sensor as described in the preceding paragraph but not necessarily an ECU that is mounted on the throttle bodies, a compensating circuit is provided in the output of the throttle position sensor to the electronic control unit for compensating for known variations in the output of the throttle position sensor.

DETAILED DESCRIPTION OF THE PREFERRED EMBODIMENTS

Embodiment of FIGS. 1–12

Figure 1:
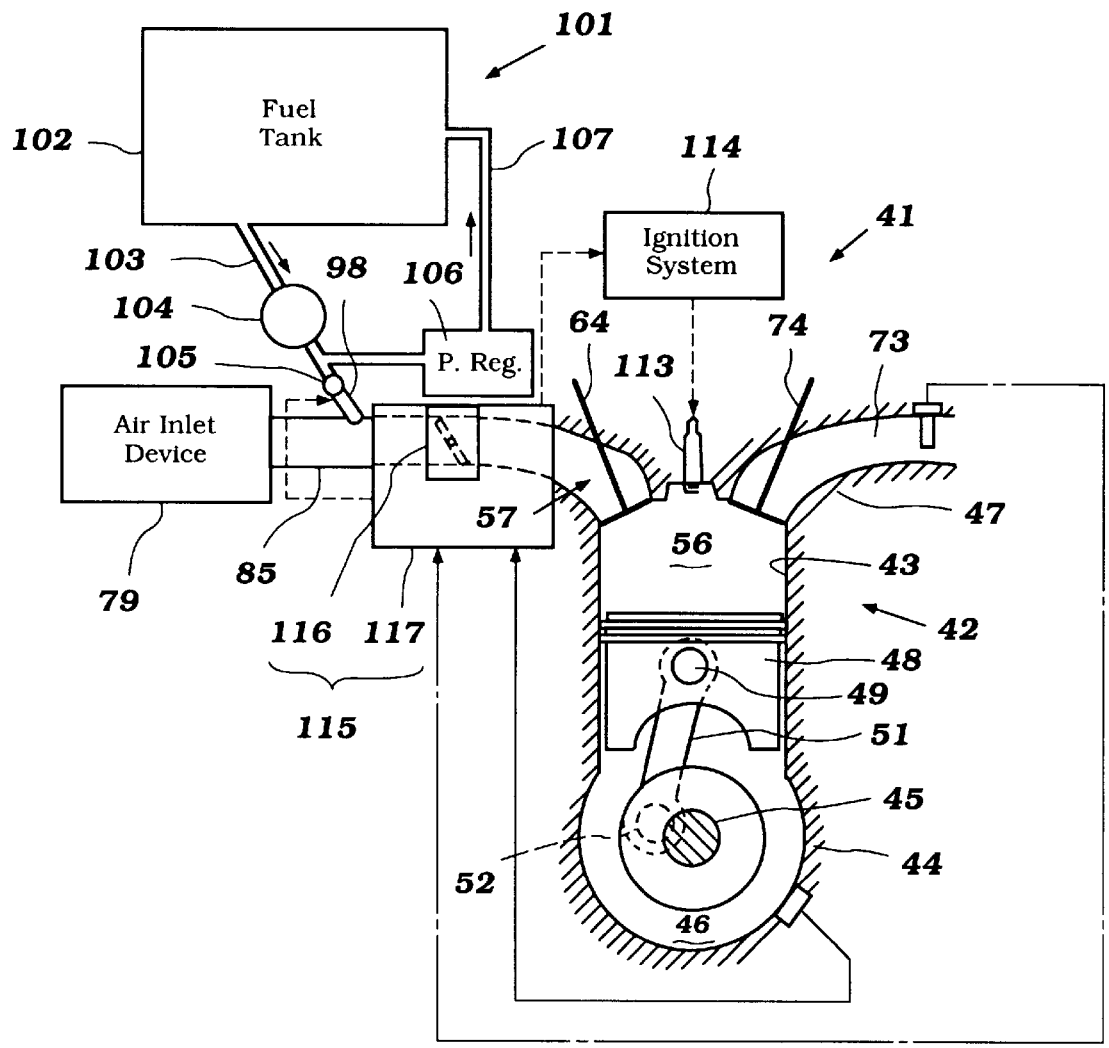
FIG. 1 is a partially schematic cross-sectional view taken through a single cylinder of a multiple cylinder engine constructed in accordance with a first embodiment of the invention.

An internal combustion engine constructed and operated in accordance with a first embodiment of this invention is depicted in FIGS. 1–12 and is indicated generally by the reference numeral 41. The engine 41 is, in the illustrated embodiment, designed for utilization in a motorcycle and the construction of the motorcycle with which the engine 41 is associated is partially shown in FIG. 3. Certain features of the invention have particular utility in conjunction with applications such as in motorcycles. One reason for this is that the features of the invention provide a very compact engine construction and this is a desirable attribute with motorcycle type applications. It will be readily apparent, however, to those skilled in the art how the invention can be utilized with other types of applications for internal combustion engine.

In the illustrated embodiment, the engine 41 is of the four-cylinder inline type. Again, the invention is described in conjunction with such a particular engine configuration. However, it will be readily apparent to those skilled in the art how the invention can be utilized with engines having other cylinder numbers and other cylinder configurations. Some of the features of the invention, however, have utility in conjunction with installations where the engine 41 is mounted so that it is not in a completely vertical position but is inclined slightly to the vertical.

This is a configuration frequently used in motorcycles. Because of this inclined configuration, it should also be readily apparent to those skilled in the art how the invention can be utilized with V-type engines. Again, the cylinder configuration can vary depending upon specific applications.

The construction of the engine 41 is shown best in FIGS. 1–3 and will be described in initial detail by reference to these figures. Certain of the components, of course, are shown in other figures.

The engine 41 includes a cylinder block assembly, indicated generally by the reference numeral 42 in which four aligned cylinder bores 43 are formed. The cylinder bores 43 are formed in the illustrated embodiment by liners that are placed into the cylinder block assembly 42. It should be readily apparent, however, that the cylinder bores 43 may be formed in any of a wide variety of manner.

As will be described later, the cylinder bores 43 are numbered in sequence in certain of the figures from the camshaft drive end of the engine and this numbering will be referred to later inasmuch as it has relevance to the spacing relationship of the cylinder bores and the induction system which serves them.

Figure 2:
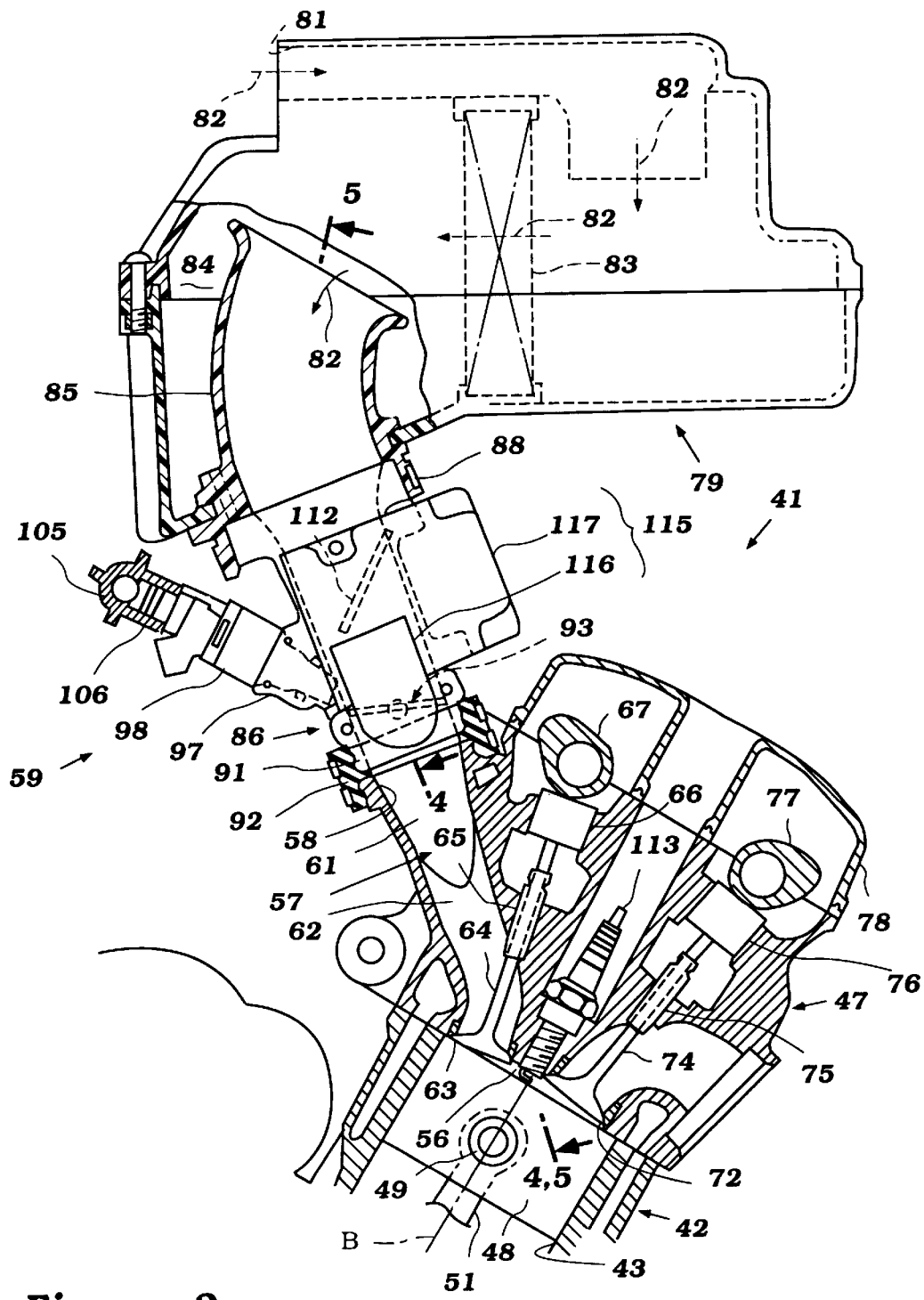
FIG. 2 is an actual, enlarged, cross-sectional view taken along the same plane as FIG. 1 showing the components in their actual configuration.

A crankcase assembly, shown partially in FIG. 1 and identified by the reference numeral 44, closes the lower ends of the cylinder bores 43. A crankshaft 45 is rotatably journaled within a crankcase chamber 46 that is formed by the crankcase member 44 and the cylinder block 42. The rotational journaling of the crankshaft 45 may be of any type known in the art.

Since the invention deals primarily with the induction and charge forming system for the engine and certain components and controls associated therewith, some components of the engine 41 are described and illustrated only partially, not at all, or schematically. Where any of these basic components are not illustrated or described, any construction known in the art may be employed.

The upper ends of the cylinder bore 43 are closed by a cylinder head assembly, indicated generally by the reference numeral 47 and which is affixed in a known manner to the cylinder block 42 in a closing relationship with the cylinder bores 43. Suitable seals may be employed for providing pressure seals around the cylinder bores 43.

Pistons 48 reciprocate in each of the cylinder bores 43. These pistons 48 are connected by means of respective piston pins 49 to the upper or small ends of connecting rod 51. The lower or big ends of the connecting rod 51 are journaled on throws 52 of the crankshaft 45 in a known manner.

The pistons 48 cooperate with the cylinder bores 43 and recesses 56 formed in the lower sealing surface of the cylinder head assembly 47 to form the combustion chambers of the engine. Because at top dead center, as shown in FIG. 2, the cylinder head recesses 56 form the major portion of the combustion chamber volume, at times the reference numeral 56 will also be utilized to designate the combustion chamber.

In the illustrated embodiments, the engine 41 is depicted as being of the five valve-per-cylinder type. Although the invention has particular utility with such configurations, it will also be apparent to those skilled in the art how the invention can be employed in conjunction with engines having other numbers of valves per cylinder.

Figure 4:
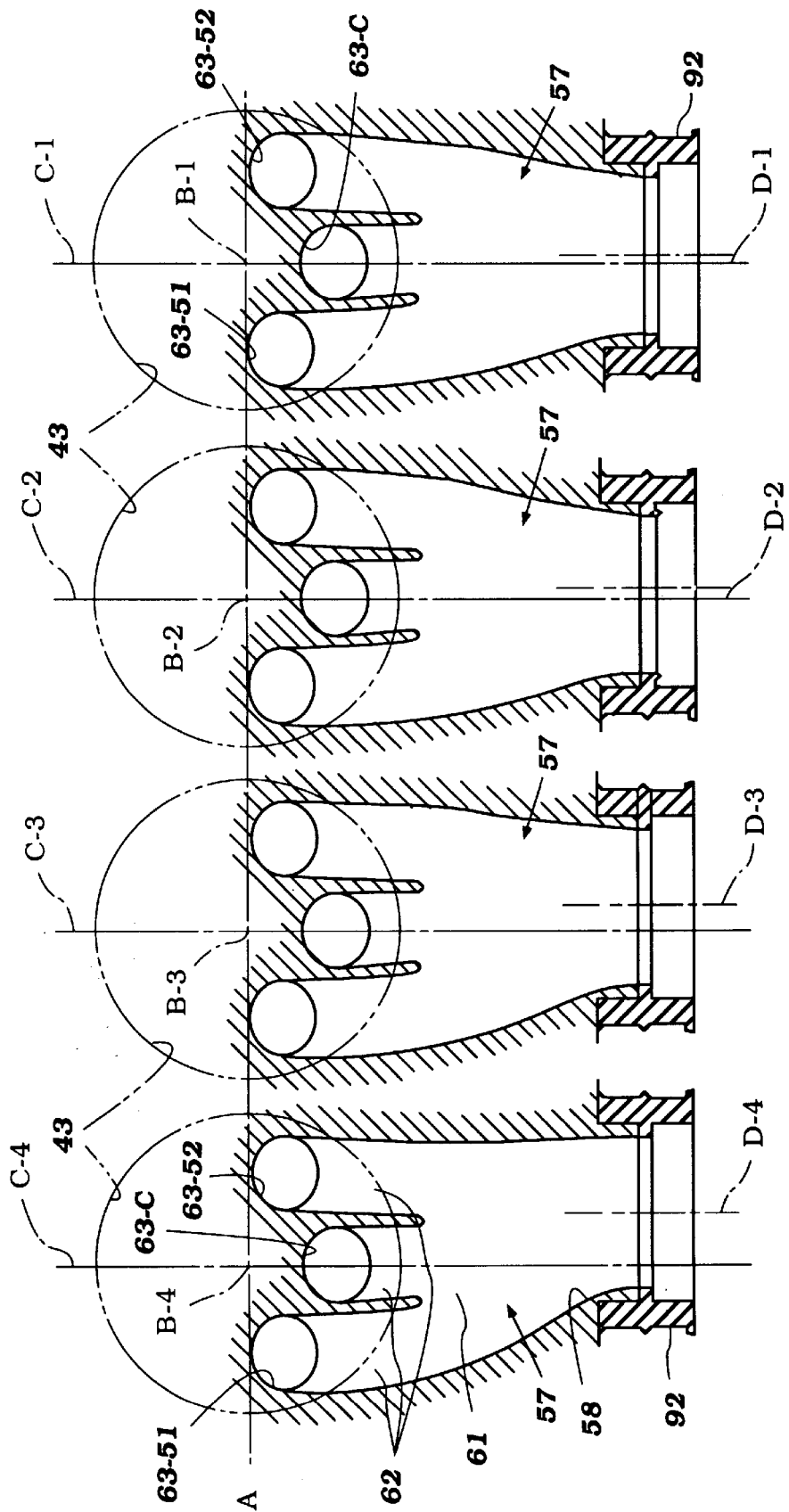
FIG. 4 is a cross-sectional view taken generally along the line 4—4 of FIG. 2.
Figure 5:
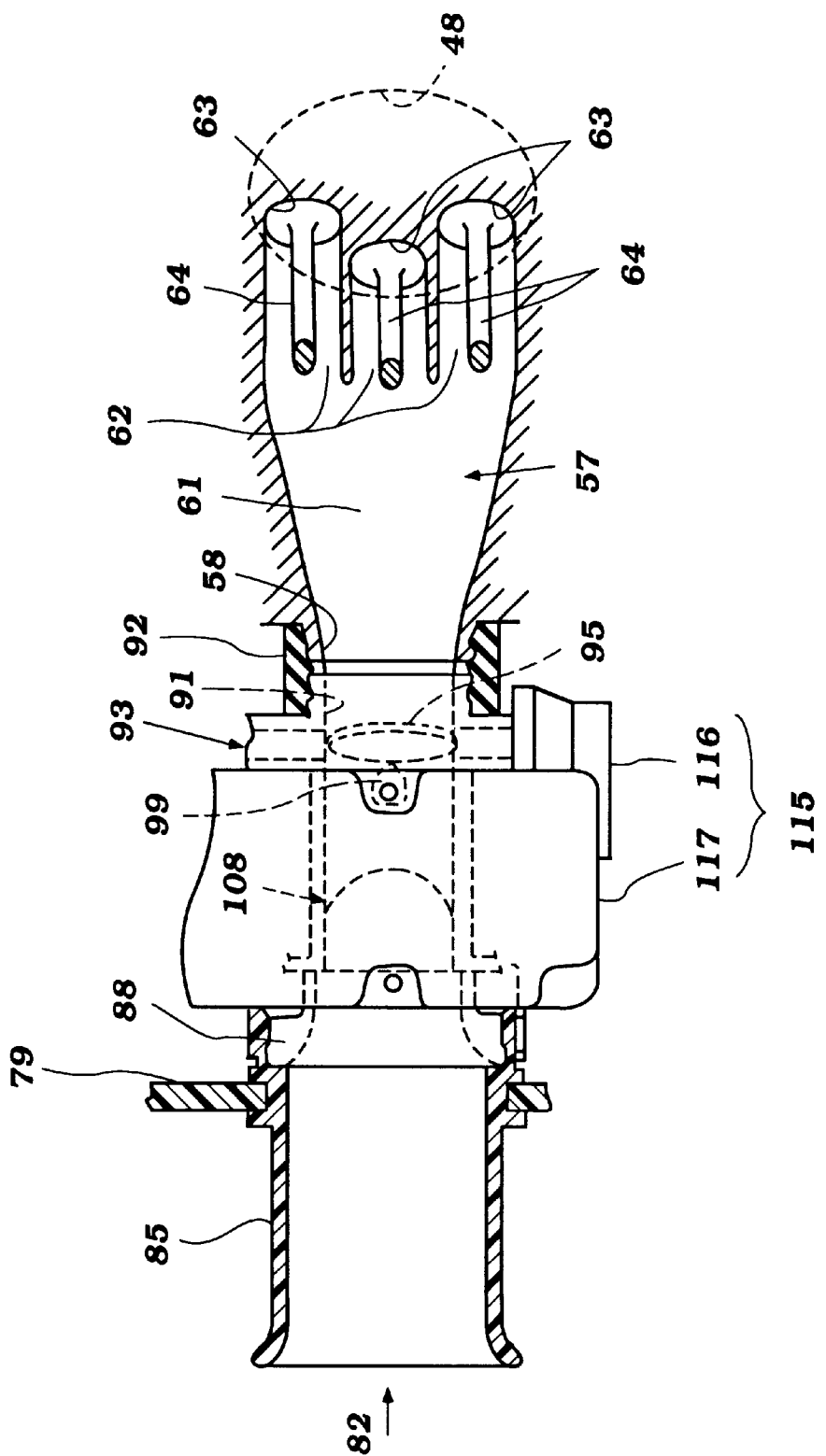
FIG. 5 is an enlarged, partial cross-sectional view taken along line 5—5 of FIG. 2, but shows the construction associated only with one cylinder at the end of the engine.

The cylinder head assembly 47 is provided with an intake passage arrangement, indicated generally by the reference numeral 57 and which is shown in best detail in FIGS. 4 and 5. This intake passage arrangement 57 is comprised of an inlet portion 58 that opens through the outer surface of the cylinder head assembly 47 and which is served by an induction system, indicated generally by the reference numeral 59. This induction system 59 will be described in more detail later.

The cylinder head intake passage 57 is of a Siamese type and extends from the inlet opening 58 to a common section 61 which then branches into three individual runner sections 62. These runner sections 62 terminate at intake valve seats comprised of a center intake valve seat 63-c and a pair of side intake valve seats 63-s1 and 63-s2. Each of these valve seats 63 is formed by an insert which may be pressed or bonded into the cylinder head assembly 47 in the combustion chamber recesses 56 thereof.

In the illustrated embodiment, the side intake valve seats 63-s1 and 63-s2 extend slightly over a central plane A that contains the axis B of each cylinder bore 43. The center intake valve seat 63-c is spaced further from this plane. Of course, other configurations can be employed.

It should be noted that in this and all subsequent embodiments the center line of the intake passages 57 is disposed at a relatively shallow angle to the axes B of the associated cylinder bore 43. Preferably this angle is in the range of 30° to 60°. This keeps the engine size very compact and provides for good cylinder charging.

Three poppet type intake valves 64 are each mounted in the cylinder head assembly 47 by means including valve guides 65 for valving the opening and closing of the respective intake valve seats 63. These intake valves 64 are closed by coil compression springs and are opened by means of thimble tappets 66 that are operated by the lobes of an intake camshaft 67, this construction being shown best in FIGS. 1 and 2.

The intake camshaft 67 is journaled in the cylinder head assembly 47 in any suitable manner and is driven at one-half crankshaft speed by a suitable timing mechanism. As seen in FIG. 3, this timing mechanism may include a timing chain or other type of transmitter contained within a timing case 68 that is formed at one end of the engine 41, which one end may be considered to be the front end even though it is a side thereof when installed in the motorcycle.

Figure 3:
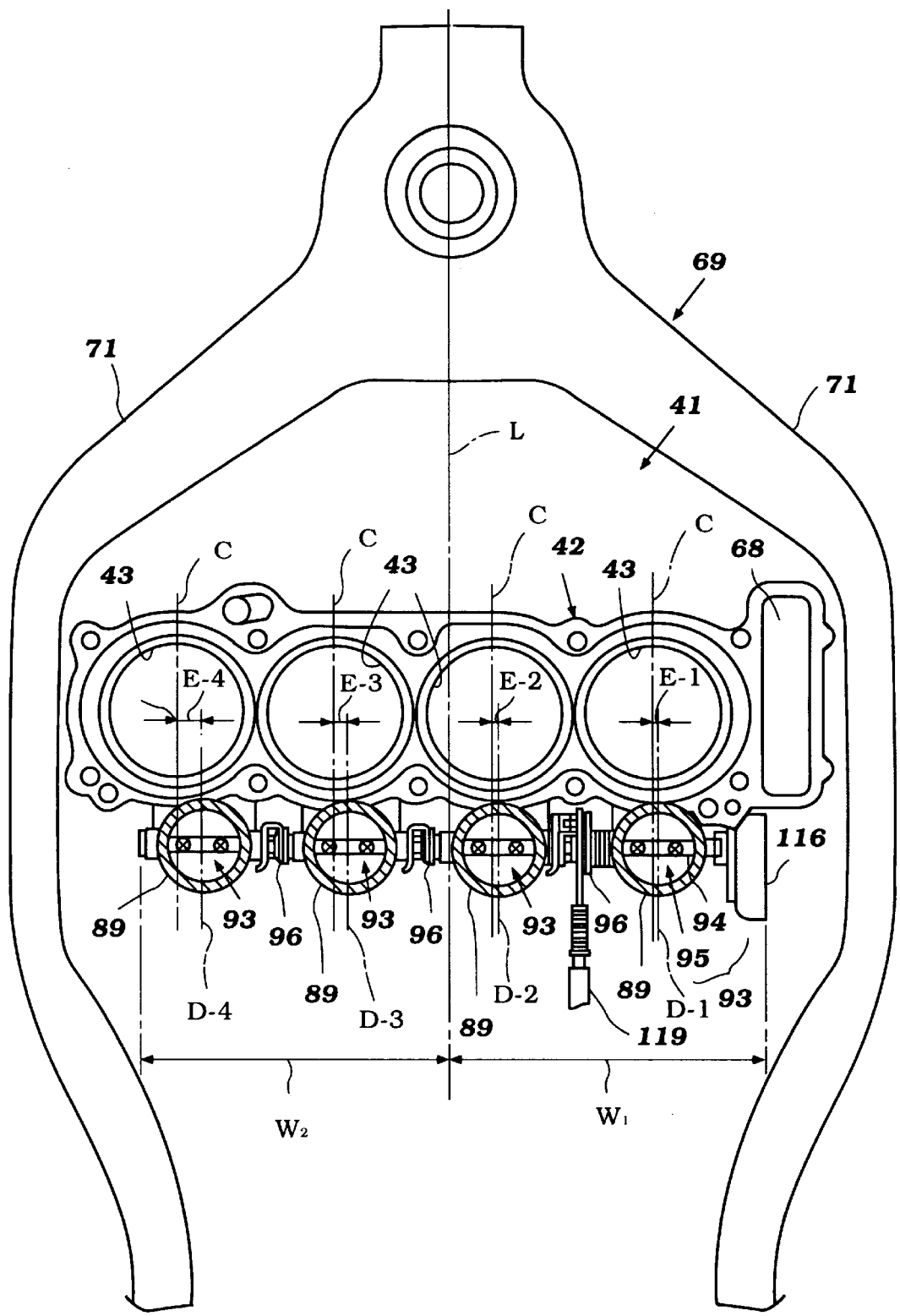
FIG. 3 is a top plan view of the engine mounted in the supporting environment of a motorcycle with the cylinder head and components removed to show the orientation of the intake passages and cylinder bore axis.

This configuration appears in FIG. 3 wherein the motorcycle frame is indicated generally by the reference numeral 69 and has a pair of side members 71 that extend along opposite sides of the engine 41 and which has a longitudinal center plane L indicated in this figure. It should be noted that, as seen in this figure, transverse plains C containing the cylinder bore axes B and extending perpendicular to the plane A are staggered at different distances from the longitudinal center plane L. This is in part done in order to accommodate the timing case 68 at one end of the engine.

As may be seen in FIG. 3, the cylinder bore center axes A are all spaced at equal distances from each other, but are staggered relative to the center plane L due to the transverse offsetting of the engine 41 in the frame 69. The significance of this construction will be described in more detail later.

In addition to the intake valve 64 and the intake passage arrangement 57, each cylinder bore 42 and combustion chamber 56 is served by an exhaust system which includes a pair of exhaust valve seats or ports 72 that are formed on the side of the cylinder head recess 56 of the plane A opposite the intake valve seats 63. These exhaust ports 72 communicate with a Siamese type exhaust passage 73 that is formed in the cylinder head assembly 47 and which extends through to an exterior surface thereof An exhaust system (not shown) is affixed to the side of the cylinder head assembly 47 for collecting the exhaust gases from the passages 73 and discharging them to the atmosphere in a known manner.

Exhaust valves 74 are slidably supported in the cylinder head assembly 47 by exhaust valve guides 75. Like the intake valve 64, the exhaust valves 74 are urged to their closed positions by means of valve springs (not shown). Thimble tappets 76 are actuated by the lobes of an exhaust camshaft 77 in a known manner. The exhaust camshaft 77 is also journaled in the cylinder head assembly 47 for rotation about an axis parallel to that of the intake camshaft 57. The aforenoted camshaft driving mechanism drives the exhaust camshaft 77 at one-half crankshaft speed like the intake camshaft 67.

The intake and exhaust camshafts 67 and 77 and the valve actuating mechanism described is contained within a cam chamber formed in the upper end of the cylinder head assembly 47. This cam chamber is closed by a cam cover 78 that is affixed to and forms a part of the cylinder head assembly 47.

The induction system 59 which supplies a fuel and air charge to the combustion chambers 56 for combustion will now be described by reference initially to FIGS. 1 and 2, and then continuing on to certain additional figures, as will be described.

The induction system 59 includes an air inlet device 79 that is mounted beneath the rider's seat in the associated motorcycle. This induction system has a ram-type inlet opening 81 through which air can be inducted in the direction shown by the arrows 82 in FIG. 2 and certain of the other figures.

This air inlet device 79 also supports a filter element 83 through which the inducted air flows toward an outlet section 84 formed on the downstream side of the filter element 83. A plurality of intake trumpets 85 are formed on the housing of the inlet device 79 and each communicates with a respective throttle body assembly, indicated generally by the reference numeral 86.

Figure 6:
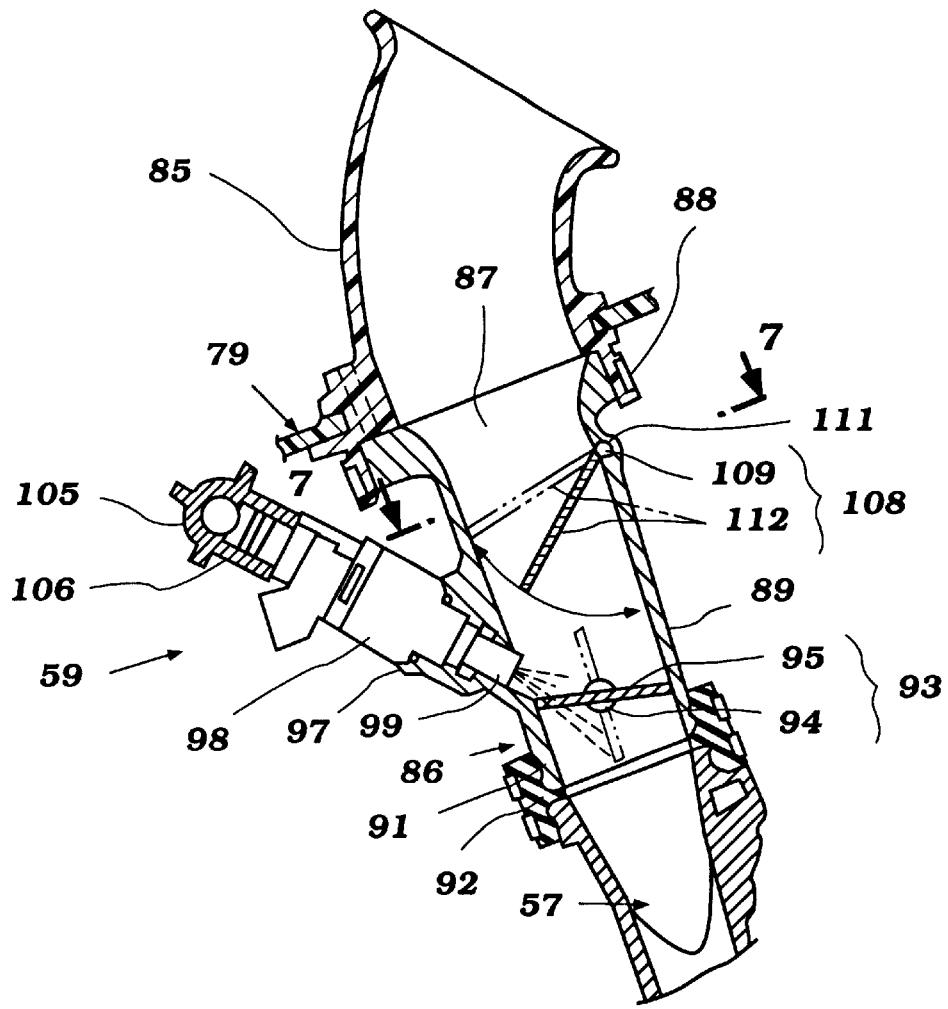
FIG. 6 is an enlarged cross-sectional view, taken along the same plane as that of FIG. 2 and but also shows the throttle body and buffer valve in cross section.
Figure 7:
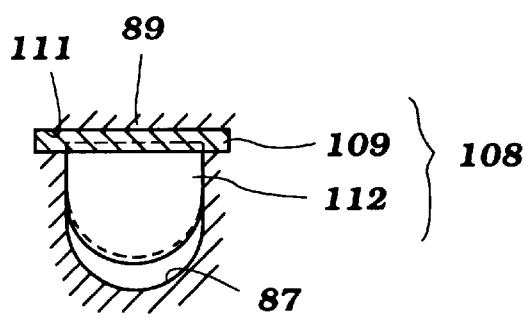
FIG. 7 is a cross-sectional view taken along the line 7—7 of FIG. 6.
Figure 8:
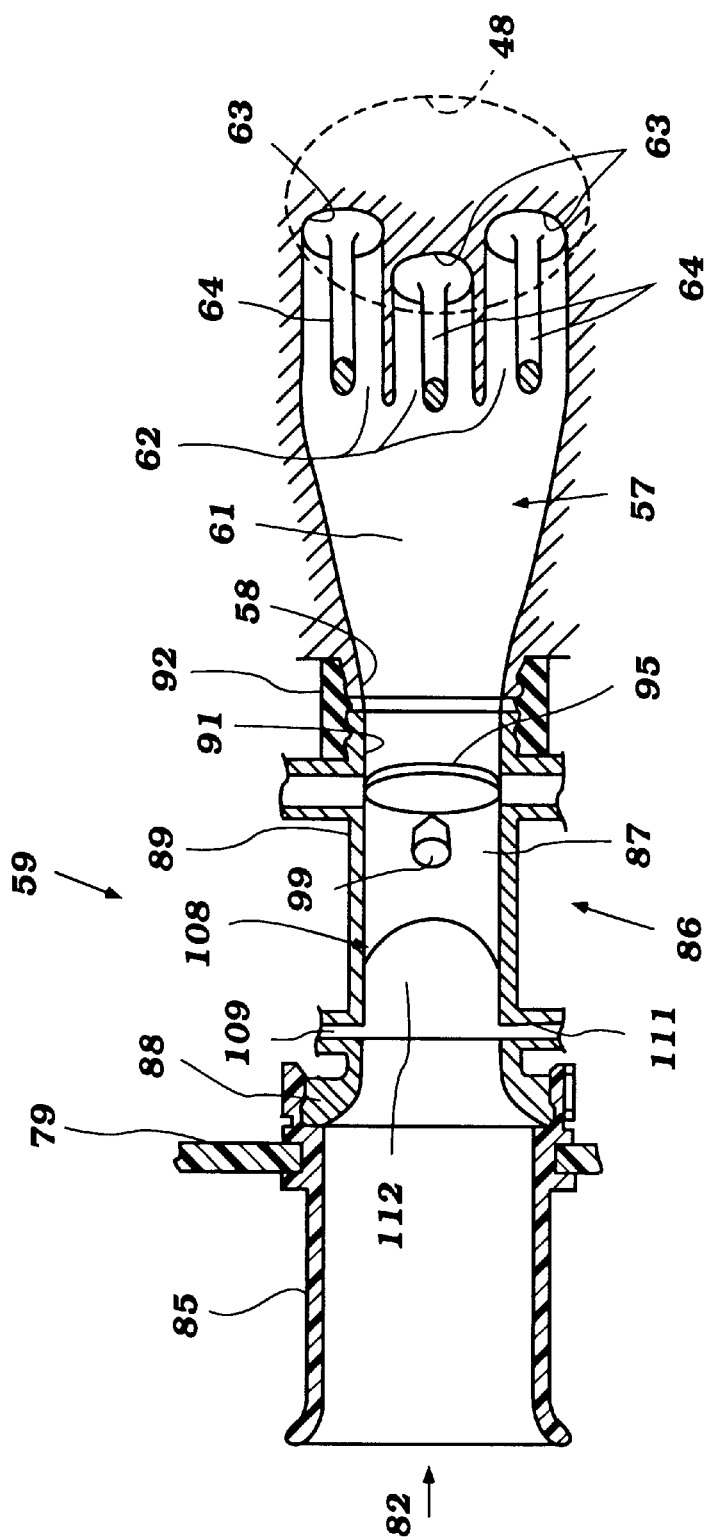
FIG. 8 is a cross-sectional view taken along the same general plane as FIG. 5 but shows the cross section through the entire intake passage.

These throttle body assemblies 86 have a construction which is best shown in FIGS. 6, 7 and 8. Each throttle body assembly 86 is comprised of an inlet tract 87 that communicates with the trumpets 85 and which is connected to the inlet device 79 by sealing-type connectors 88. These connectors 88 permit some flexibility in the connection between the elements so as to accommodate vibrations and also so as to compensate for misalignments.

The throttle body assembly 86 is comprised of a main portion 89 which forms the passage 87 and which has a discharge end 91 that is affixed in sealing relationship with the cylinder head intake passage opening 58 by a further flexible connector 92. Hence, there is a straight-through flow path from the inlet trumpets 85 to the cylinder head intake passages 57.

A flow controlling throttle valve assembly, indicated generally by the reference numeral 93, is provided in each throttle body 86 for controlling the flow therethrough. These throttle valve assemblies 93 include throttle valve shafts 94 that are rotatably journaled in the throttle body portion 89. Butterfly-type throttle valve 95 are affixed to the throttle valve shafts 94 for controlling the flow therethrough in a manner that is well-known.

In accordance with an important feature of the invention, the intake passage volume between the throttle valve 95 and the intake port 63 is chosen to be at a ratio relative to the exhaust gas volume ratio of the individual combustion chambers within a range of 0.15 to 0.45. As noted in the aforenoted co-pending applications, this provides good combustion control. This arrangement means that the throttle valves 95 are quite close to the intake ports 63 as has already been noted.

As may be best seen in FIG. 3, the throttle valve shafts 94 of the respective throttle valve assemblies 93 are connected to each other by coupling mechanisms 96. These coupling mechanisms 96 permit the adjustment in the phase angle between the respective throttle valve assemblies 93 for their synchronization, as is known in this art.

As may be best seen in FIGS. 3 and 4, it should be noted that the centers of the cylinder head intake passage inlet openings 58 lie on lines indicated at D with the respective openings indicated at D-1, D-2, D-3 and D-4, utilizing the aforenoted cylinder number ordering. The centers of these openings D-1, D-2, D-3 and D4 are offset from the cylinder bore axis and specifically the planes C containing the respective axes by offset amounts E which progressively increase from the one end of the engine to the other. In other words:

$$E\text{-}4 > E\text{-}3 > E\text{-}2 \geq E\text{-}1$$

It may be that the offset amounts E1 and E2 are equal and approximately 2 millimeters. The offset amounts E3 and E4 are, respectively, 7 millimeters and 14 millimeters in a preferred arrangement. This particular offsetting is chosen so as to maintain a relatively short overall length which is equal to W1+W2 for the throttle valve actuating assembly including a throttle position sensor, to be described shortly. This permits a compact assembly and accommodates the fact that the frame side members 71 converge in a rearward direction.

Thus, this permits the induction system to be positioned in a more compact arrangement and accommodates the positioning of a throttle position sensor, as will be described later. These offsets are done in such a manner as to minimize uneven flows in the respective intake passages.

Each of the throttle body assemblies 86 is provided with an integral, injector mounting portion 97 that receives and supports a fuel injector 98. The fuel injectors 98 are of the electrically solenoid operated type and include an injector valve (not shown) that is activated by a solenoid for controlling the timing and duration of fuel discharged therefrom. Fuel is supplied to the injectors 98 from a fuel supply system that will be described shortly.

Each fuel injector 98 has a nozzle portion 99 in which the injector valve is mounted and which defines a spray pattern as shown best in FIG. 6. FIG. 6 illustrates the position of the throttle valve assembly 93 in its idle position in solid lines and in its full throttle position in phantom lines. The location and orientation of the injectors 98 is such that they spray downwardly toward the throttle valve shafts 94 and in a direction where the fuel sprayed therefrom will impinge on the back side of the throttle valves 95 when in their idle position.

As the throttle valves 95 progressively open, the spray will still be on the back side, but in the full throttle position, the spray will be primarily on the side below the throttle valve shaft 94 and toward the intake ports 63. This arrangement will ensure that fuel from the injectors 98 will not deposit on the walls of the throttle body 89 that define the passage 87. Rather, the fuel will be injected so as to impinge on the throttle valve plate 95 so as to be swept by the flowing air directly into the cylinder head intake passages 57. Any fuel that impinges on the throttle valve plate 95 will be rapidly dissipated by the air flow and will actually enter the cylinder head intake passage 97 on the cycle for which injection was intended.

It is almost certainty that some fuel will be deposited in the induction system and it is better to have the fuel deposited on a member that is mounted in the induction system and across which there is rapid air flow so as to ensure distribution of the fuel as desired. Thus, by spraying onto the throttle valve 95, impingement of the spray on the walls that define the induction passage 87 is avoided and good fuel distribution will be ensured.

The fuel supply system for supplying fuel to the fuel injectors 98 will now be described by primary reference initially to FIG. 1, wherein the fuel supply system is identified generally by the reference numeral 101. This fuel supply system 101 includes a fuel tank 102 which is mounted at an appropriate location in the associated vehicle. In the motorcycle type application described, this position would be one preferably above the engine 41.

A conduit 103, in which a fuel shut-off valve (not shown) may be provided, supplies fuel from the tank 102 to a fuel pump 104. The fuel pump 104 may be driven in a suitable manner and pressurizes the fuel and delivers it to a fuel rail 105. As best shown in FIGS. 2 and 6, the fuel rail 105 has individual nipple portions 106 that cooperate with the injectors 98 for delivering the fuel to them under pressure in a known manner.

Referring again to FIG. 1, at one end of the fuel rail 105, there is provided a pressure regulating valve 106 that controls the pressure of fuel supplied to the injectors 98. This is done by bypassing excess fuel back to the fuel tank 102 through a return line 107.

Referring now back in detail to the construction of the air induction system 59, it should be noted that the close positioning of the throttle valve 95 to the intake ports 63 provides very quick throttle response. That is, as the throttle valves 93 are opened and closed, the air flow will rapidly change. Although this is desirable for good throttle response, under some running conditions, it provides a difficulty in maintaining the desired fuel air ratio. This is in part due to the fact that the inertia of fuel is much greater than that of air.

In conventional carbureted engines, this condition is compensated for by an accelerating pump. This also can be accommodated in part with a fuel injection system by controlling the individual amount of fuel injected per cycle. However, there are some running conditions such as when the throttle is being blipped and the engine is not under load very uneven running can result because of rapid air flow changes and difference in fuel and air inertia.

Therefore, and in accordance with an important feature of the invention, a buffer valve, indicated generally by the reference numeral 108, is provided in the intake system and specifically, in this embodiment, in the throttle body assembly 86 for retarding the change in rate of air flow. Thus, even though the throttle plates 95 may be rapidly opened, the increase in air flow is retarded.

This buffer valve assembly 108 is shown in most detail in FIGS. 6–8 and includes a valve shaft 109 that is rotatably journaled within a bore 111 formed in the throttle body 89 at one side thereof. A flap-type valve plate 112 is integrally formed with the shaft 109 and extends into the intake passage 87.

As may be seen in FIG. 7, in its fully closed position, this flapper valve 112 does not completely close the intake passage. The friction between the valve shaft 109 and the housing bore 111 will somewhat retard the rate of opening and closing of the valve 108 in response to airflow and thus, will slow down the change and rate of air flow and, accordingly, ensure that the fuel air mixture ratio does not rapidly change under these conditions.

If desired, a biasing spring may be associated with the flapper valve 109 to hold it in one position or the other. Normally this would be in the closed position but not necessarily so. Thus, this arrangement will ensure that the engine runs smoothly even when the throttle is blipped under no load conditions.

The engine 41 is also provided with spark plugs 113 (FIGS. 1 and 2) that are mounted in the cylinder head assembly 47 so that their spark gaps are disposed substantially on the axes B of the cylinder bores 43. An ignition system, shown schematically at 114 is provided for firing these spark plugs 113 in a known manner.

In accordance with another feature of the invention, there is provided a control which controls the timing of firing of the spark plugs 113 by the ignition system 114 and also the timing and duration of fuel injection from the fuel injectors 98. This control is indicated generally by the reference numeral 115 and in accordance with an important feature of the invention is mounted directly on one of the throttle bodies 89 and preferably the throttle body associated with the number one cylinder.

Figure 11:
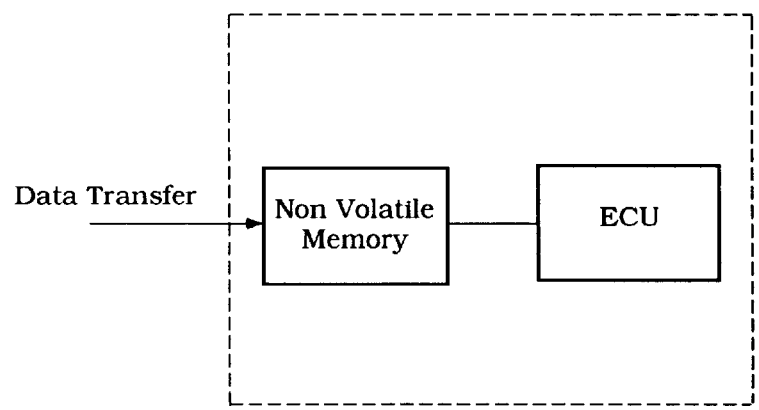
FIG. 11 is a schematic view showing how the data is transferred to the controller.

This structure is shown schematically in FIGS. 9, 11 and 12 but before referring to these figures, its physical structure will be described by reference to FIGS. 1–3 and 5. This control assembly 115 includes a number of sensors including primarily a throttle position sensor 116. The throttle position sensor 116 may be of the rheostat type and is associated with throttle valve shaft 94 of the throttle body assembly 89 associated with the number one cylinder. Hence, the throttle position sensor 116 is mounted on one side of the throttle body 89 in proximity to the timing case 68 at this end of the engine. This defines the end of the dimension W1 at this end of the engine.

This throttle position sensor 116 outputs a signal, in a manner to be described, that is indicative of throttle position. Normally this signal is transmitted by a long conductor to a remotely positioned ECU. However, in accordance with this feature of the invention, and ECU, indicated generally by the reference numeral 117, is mounted directly on one or more of the throttle bodies 89 at this end of the engine 41. Thus, long conductors are avoided and, in fact, can be totally eliminated depending upon the type of circuit board that is employed in the ECU.

Figure 9:
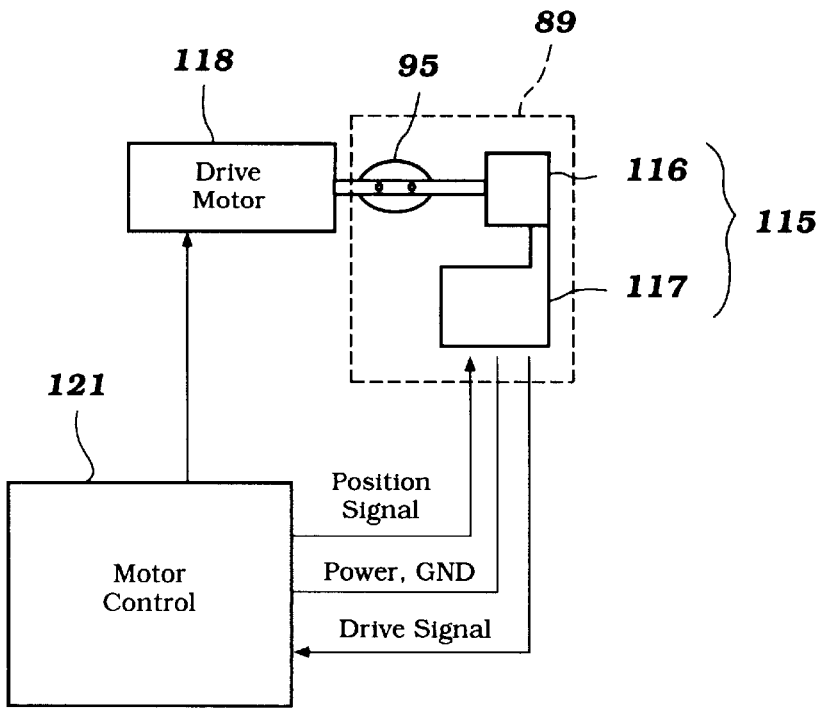
FIG. 9 is a partially schematic view showing the elements of the engine and throttle control.

It should be noted that the throttle valve shafts 94 may be operated by a servo motor, as shown in FIG. 9, which servo motor is indicated generally by the reference numeral 118 and which operates the throttle valves 95 through a wire actuator 119 as seen in FIG. 3. This type of system is a so-called "fly-by-wire" type system and includes a motor control circuit 121 that operates to drive the drive motor 118 and position the throttle valves 95.

At the same time, a signal is sent back to the ECU 117 from the motor control 121 to indicate the operation of the motor control circuit. An operating signal is transmitted from the ECU to the motor control 121 so as to operate the drive motor 118. Although any known strategy may be employed, another important feature of the invention deals with the arrangement wherein the output of the position sensor 116 is adjusted to take care of nonlinearity in its output signal.

Figure 10:
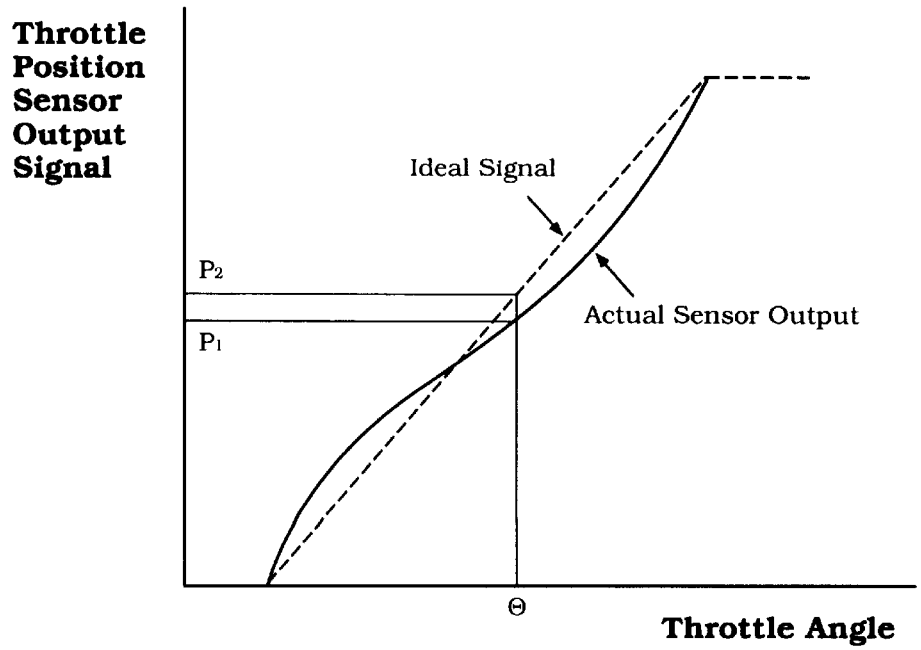
FIG. 10 is a graphical view showing how the output of the throttle position sensor varies in relation to ideal to explain how the system compensates for variations in signal.

This can be understood by reference to FIG. 10 wherein the desired ideal reference signal output is indicated by the broken line. It will seen that this line is a straight line having a slope that is indicative of the actual desired output of the sensor 116. However, these sensors are not truly linear and hence, the actual output is somewhat of a sinusoidal wave as shown in this figure.

Thus, at a given throttle angle opening such as the angle S, the actual output signal P1 will be less than the correct output signal P2. In order to accommodate for this, the control system utilized in FIGS. 11 and 12 is employed. FIG. 11 shows how the data is transferred from the sensor to a nonvolatile memory and the information is processed by a microcomputer so as to provide a compensation amount determined by a map.

Figure 12:
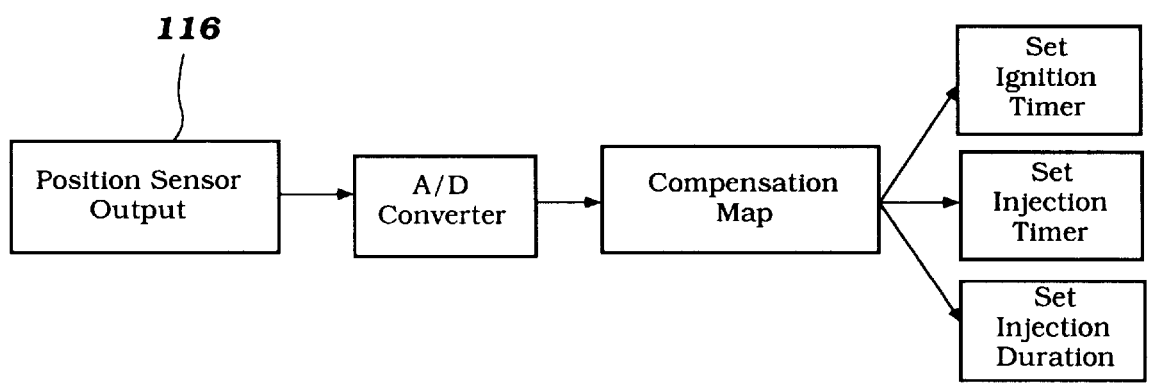
FIG. 12 is a graphical view showing how the throttle position signal is adjusted to compensate for the condition shown in FIG. 10 and how the control is output to the controlled engine components.

Hence, as seen in FIG. 12, the position sensor output from the sensor 116 is transmitted to an analog to digital converter which, in turn, outputs a signal to the ECU which applies a compensating map based upon a curve similar to that shown in FIG. 10. This then provides output signals to set both the ignition timing, the fuel injection timing, and also the injection duration. Of course, other control signals in addition to the throttle position sensor can be employed in the control strategy.

Figure 13:
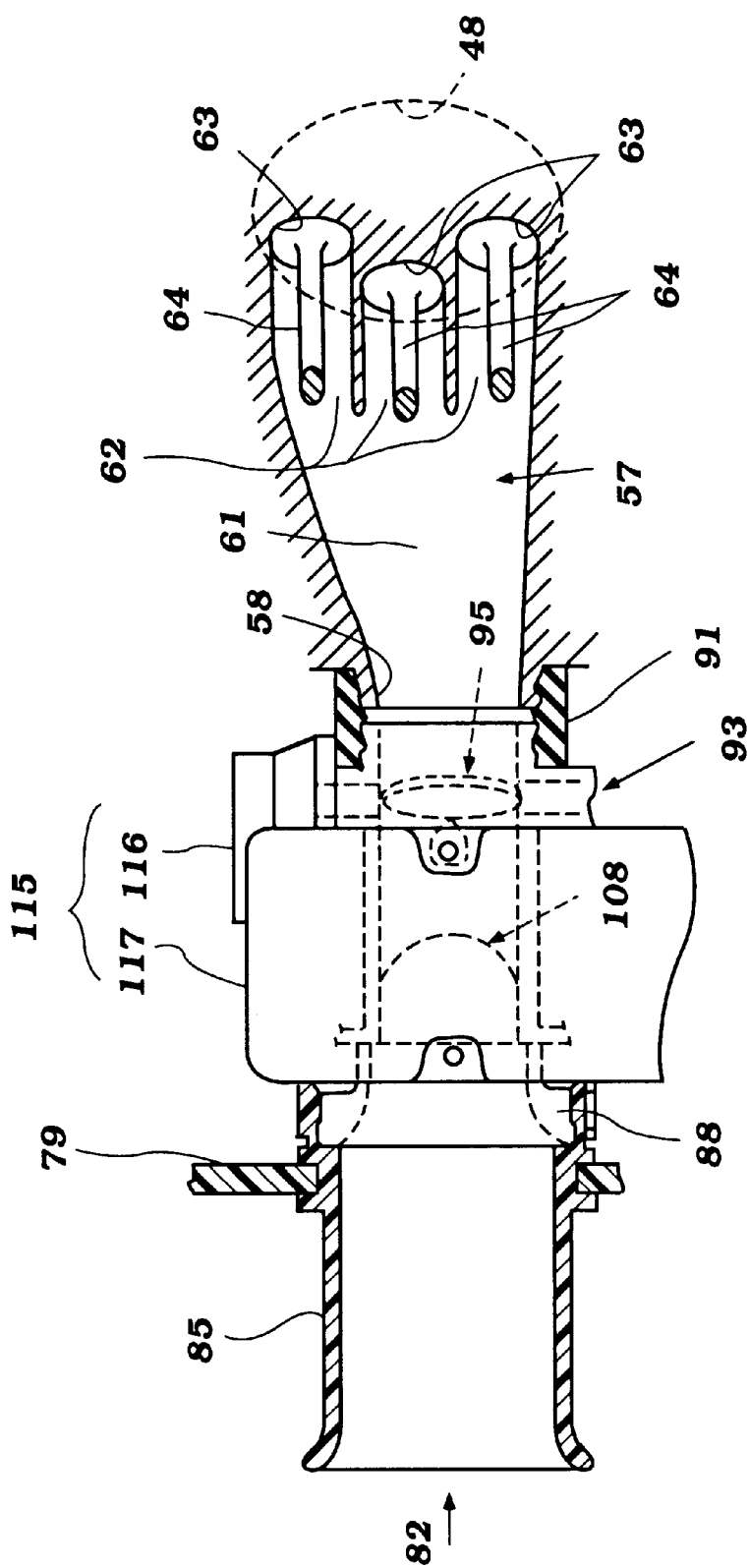
FIG. 13 is a partial cross-sectional view, in part similar to FIG. 5 but shows another embodiment of the invention and thus is taken in relation to another cylinder.

Embodiment of FIG. 13

In the embodiment as thus far described, and by particular reference to FIG. 3, it should be noted that the throttle position sensor 116 is adjacent the timing chain case 68. Although this provides a compact assembly, it should also be noted that there is a generally open area at the opposite end of the throttle valve assemblies 89. FIG. 13 shows an embodiment which is the same as the embodiment already described, but which places the throttle position sensor 116 at this end of the engine so that it is associated with the throttle body 89 of the number 4 cylinder.

This construction is shown in FIG. 13. Because of the relocation of the throttle position sensor 116 at this end of the engine, the ECU 117 is also so located so that the control assembly 115 is at the end of the engine 41 spaced from the timing case 68 in this embodiment.

As has been noted, in all other regards this embodiment is the same as that previously described and, therefore, it is believed that a further description of this embodiment or illustration of it should not be necessary to permit those skilled in the art to practice the invention in connection with this embodiment.

Figure 14:
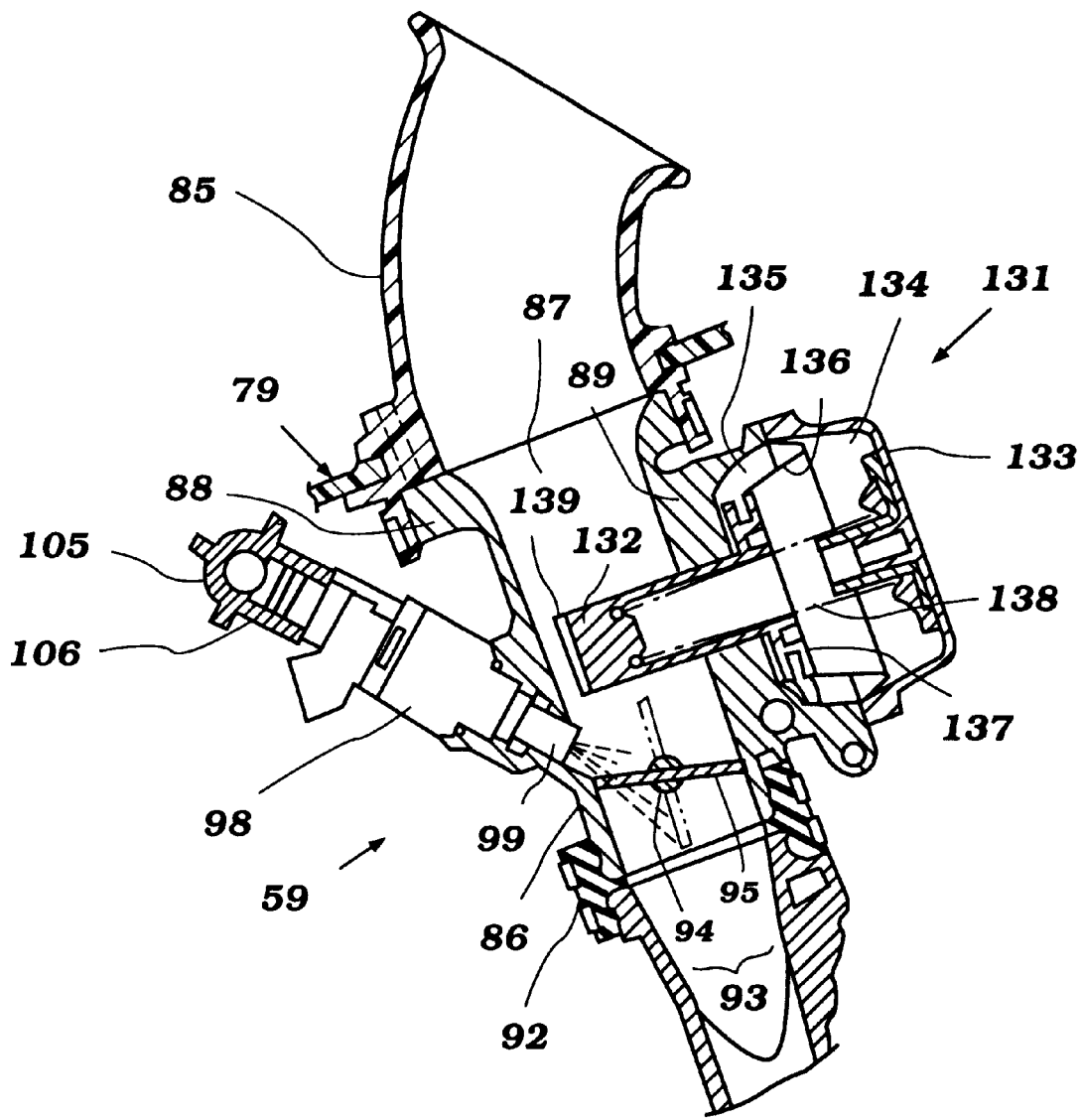
FIG. 14 is a cross-sectional view, in part similar to FIG. 6 and shows another embodiment of buffer valve.
Figure 15:
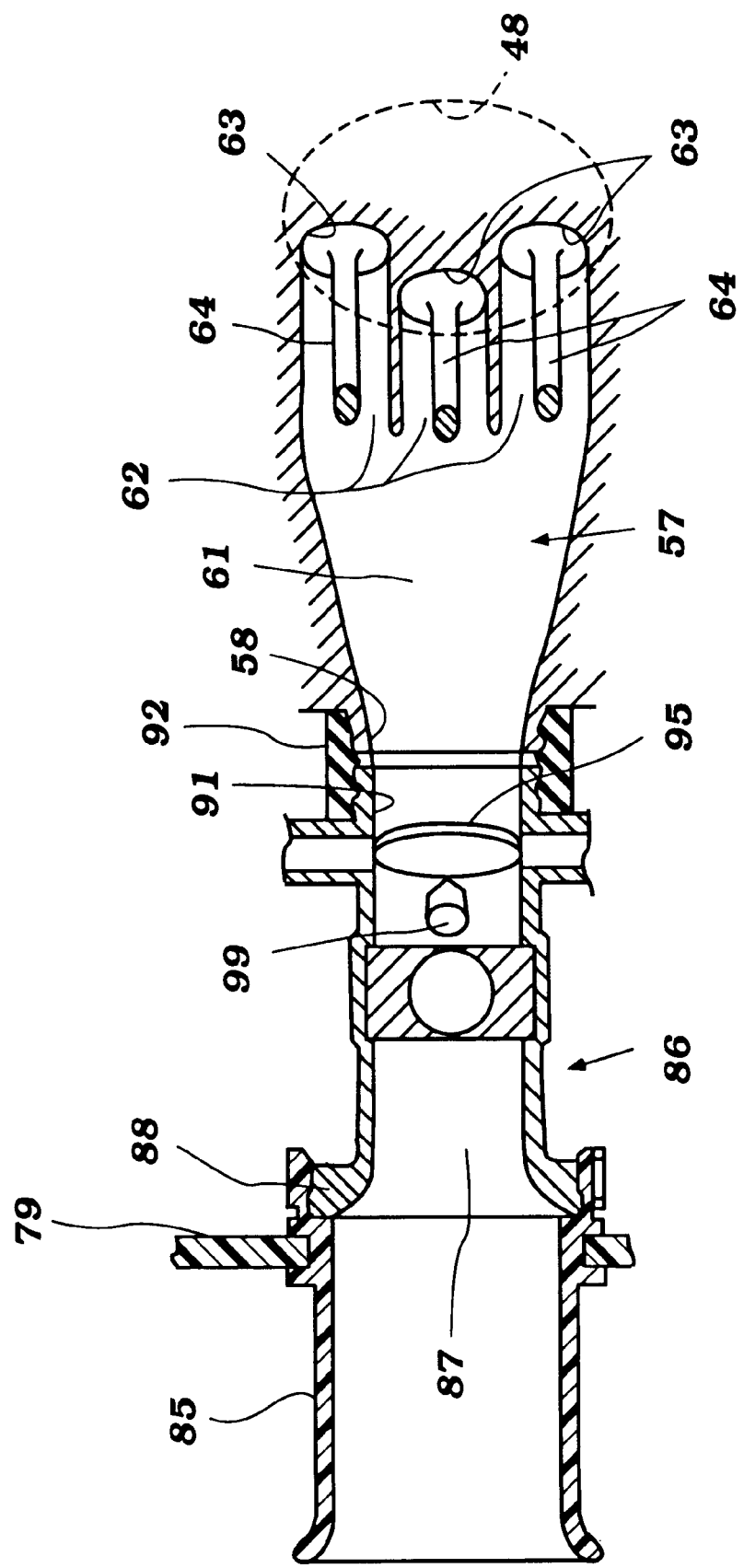
FIG. 15 is a cross-sectional view, in part similar to FIG. 8 but shows the buffer valve of this embodiment.

Embodiment of FIGS. 14 and 15

FIGS. 14 and 15 show another embodiment of the invention, which differs from the two embodiments thus far described only in the type of buffer valve employed. Because this is the only difference, only two views, corresponding to FIGS. 6 and 8, respectively, of the first embodiment, are believed to be all that is required to permit those skilled in the art to understand this embodiment and to practice it. Where components of this embodiment are the same as those previously described, they have been identified by the same reference numerals and will be described again only insofar as is necessary to understand the construction and operation of this embodiment.

In this embodiment, a sliding piston-type buffer valve assembly, indicated generally by the reference numeral 131, is provided so as to control the air flow during blipping of the main throttle valve 93, so as to maintain a uniform fuel air ratio.

The buffer valve 131 includes a sliding piston 132 that is slidably supported in an opening formed in the body 89 of the throttle body assembly 86. This body portion defines a cavity along with a cover plate 133 that is divided into an induction system pressure chamber 134 and an atmospheric pressure chamber 135 by a diaphragm 136. The diaphragm 136 is clamped between the cover 133 and the throttle body 89 so as to form these two chambers.

The piston 132 has a portion 137 that is affixed to the diaphragm 136. A coil compression spring 138 in the intake system pressure chamber 134 normally urges the sliding piston 132 to its flow restricting position, as shown in FIG. 14. In this position, a cutout 139 in the end of the piston 132 provides an air flow passage.

It should be noted that this air flow passage is aligned with the nozzle tip 99 of the fuel injector 98. In this way, a high-velocity air flow will pass across the nozzle tip to assist in fuel dispersion, even when the buffer valve 132 is in its flow-restricting position.

The chamber 135 is exposed to atmospheric pressure in a suitable manner, certain examples of which will be described later in connection with other embodiments. The chamber 134, on the other hand, is exposed to pressure downstream of the buffer piston 132 through a suitable passage.

Thus, when the throttle valve 95 is blipped, the buffer valve 132 will begin to open, but at a restricted rate so as to slow down the change in air flow and achieve the same result as the buffer valve of the previously described embodiment.

Figure 16:
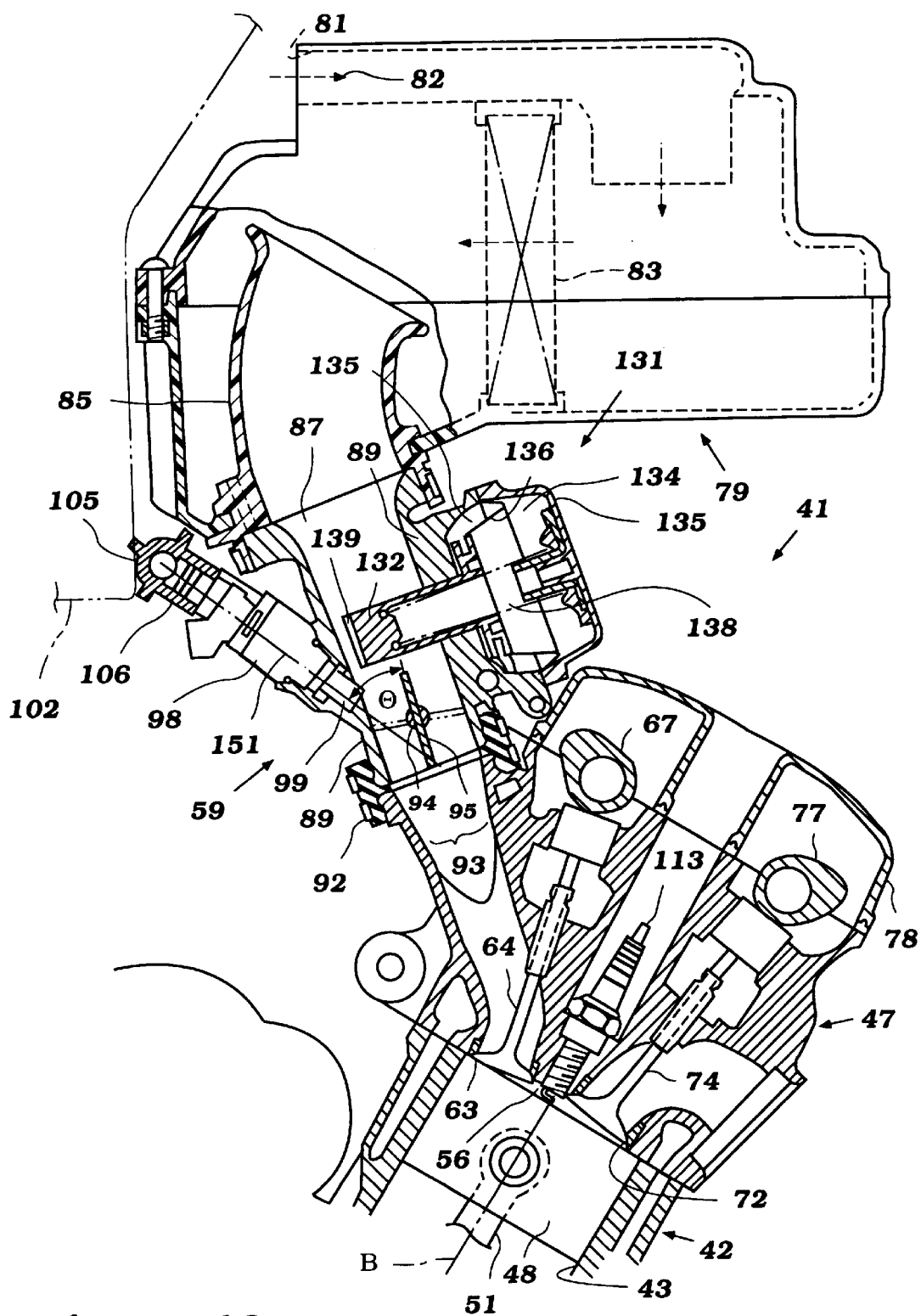
FIG. 16 is a cross-sectional view, in part similar to FIGS. 2, 6 and 14, and shows yet another embodiment of the invention.

Embodiment of FIG. 16

FIG. 16 is another embodiment which is quite similar to the embodiment of FIGS. 14 and 15, but which shows how this type of construction may be fitted into an actual motorcycle application. In this figure, components which are the same as those already described have been identified by the same reference numeral.

This embodiment, however, also shows the actual positioning of the aforenoted fuel tank, previously shown schematically and indicated by the reference numeral 102 in the motorcycle construction. It should be seen that this type of arrangement places the fuel injector 98 in quite close proximity to the fuel supply for the fuel rail 105. This shortens up the length of conduits and also reduces the likelihood of leakage.

In this embodiment, it is also seen that the central axis, indicated at 151 of the fuel injector 98, and particularly its nozzle portion 99, is at a relatively shallow angle Θ to the flow axis of the throttle body induction passage 87. This places the injector in a location where it is compact in construction and requires the air inlet device 79 to be provided with a small recess for clearance purposes. However, this small angle Θ is effective in ensuring that the fuel spray will be primarily toward the downstream side of the throttle plate 95 when in its fully opened position, so as to ensure good fuel dispersion and vaporization.

In all other regards, this embodiment is quite similar to those previously described and, for that reason, further description of this embodiment is not believed to be necessary to permit those skilled in the art to practice the invention.

Embodiments of FIGS. 17, 18, 19 and 20

Next will be described a series of four embodiments which are basically the same as the embodiments of FIGS. 14 and 15, and FIG. 16. These embodiments differ from those previously described embodiments only in the location of the fuel injector 98, and specifically its nozzle portions 99 and the spray direction therefrom. Because of that similarity, all components of this embodiment have been identified by the same reference numerals previously described, and these will be described only in connection with the positioning of the fuel injector 98 and the resulting effect of the various positionings.

In all of the embodiments as thus far described, the fuel injector 98 has been positioned so that its spray will impinge upon the throttle plate 95, regardless of the position of the throttle plate. However, the invention can be practiced with the utilization of a fuel injector position that causes the spray to impinge upon other elements within the induction passage 87.

However, these other surfaces on which the fuel spray impinges should also be disposed inwardly from the outer walls that define the passage 89. As has been noted, the air flow along these walls of the throttle body 89 may be laminar, and thus mixing is not as good as if the spray is on an object that is more centrally positioned in the intake passage 87.

Figure 17:
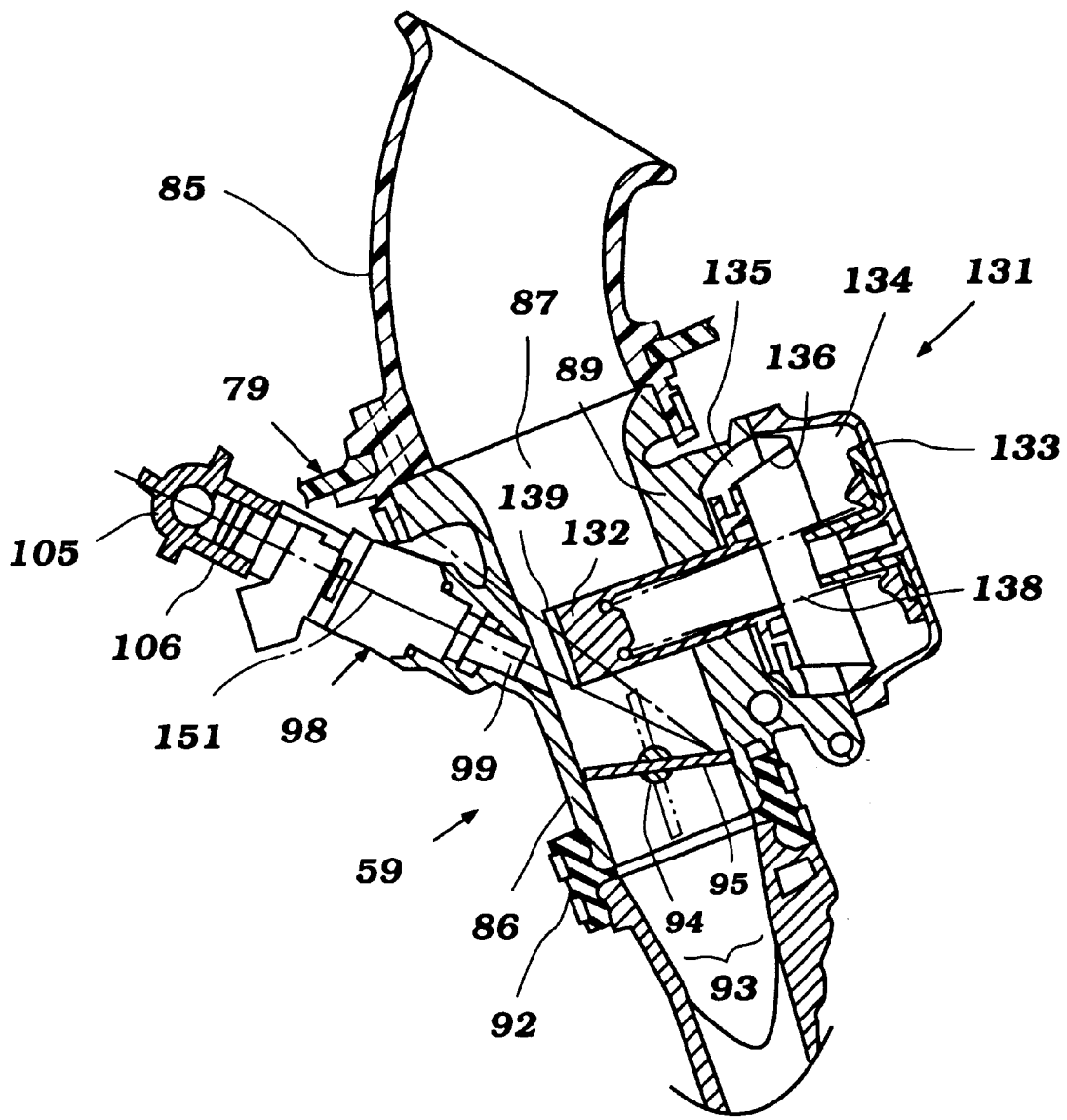
FIG. 17 is a cross-sectional view, in part similar to FIGS. 6, 14 and 16, and shows yet another embodiment of the invention.

FIG. 17 shows an embodiment wherein the fuel injector 98 is moved so that its axis 151 intersects the lower edge of the buffer valve piston 132 when in its maximum flow-restricting position. This position also is such that the spray that passes the end portion where the relief 139 is formed will strike upon either the upper end of the throttle valve plate 95 when in its fully opened position, or the upper backside of this portion when in its idle position.

Thus, when the throttle valve 95 is opened, the fuel will move its plane of impingement upwardly along the throttle plate. Also, as the buffer valve 132 opens, it will move out of the path of the spray so that all impingement will occur on the throttle plate 95.

Figure 18:
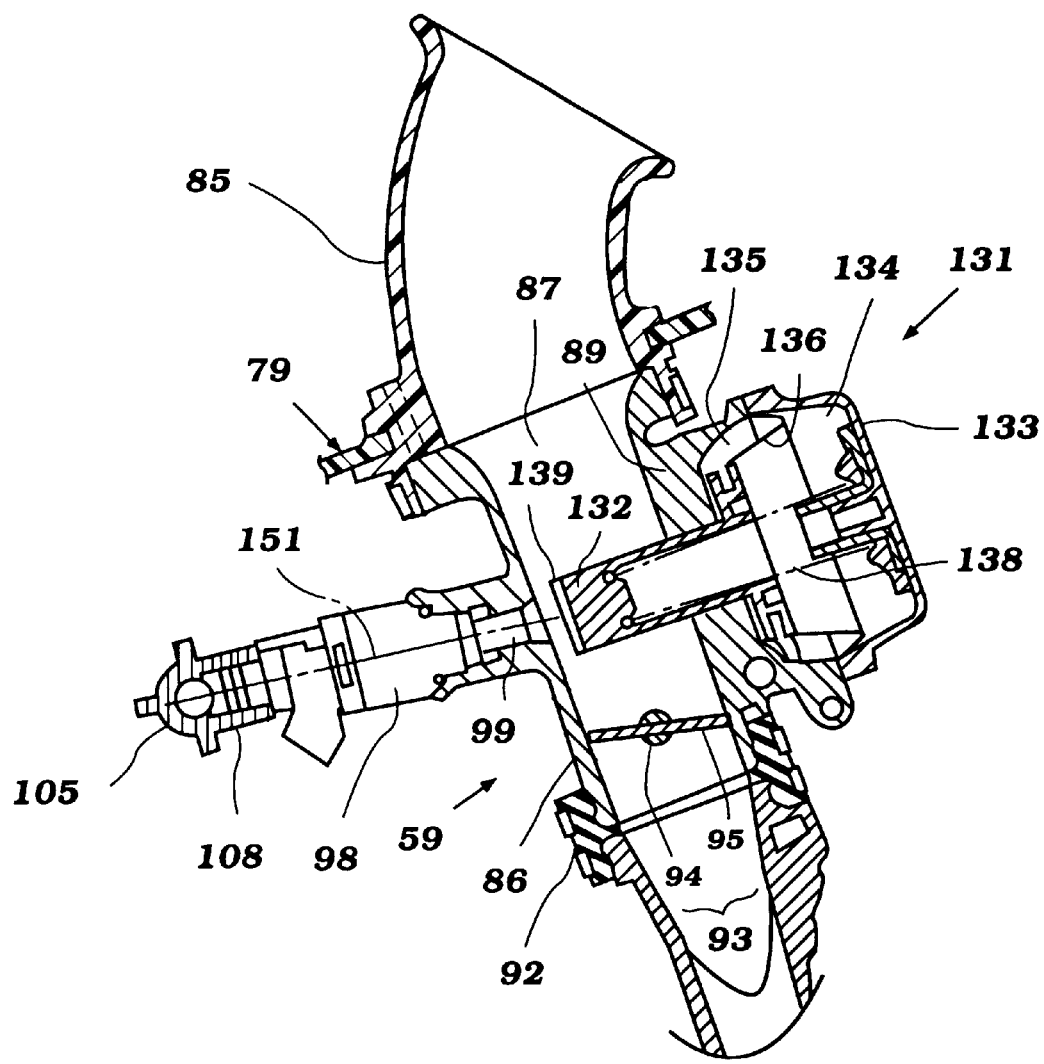
FIG. 18 is a cross-sectional view, in part similar to FIGS. 6, 14, 16 and 17, and shows another embodiment of the invention.

FIG. 18 shows another embodiment. In this embodiment, the injector 98 is positioned so that its axis 151 is almost coaxial with the reciprocal axis of the buffer valve piston 132. Thus, with this embodiment, the fuel spray will impinge on the end 139 of the buffer valve piston 132 in all positions of the buffer valve piston 132.

Figure 19:
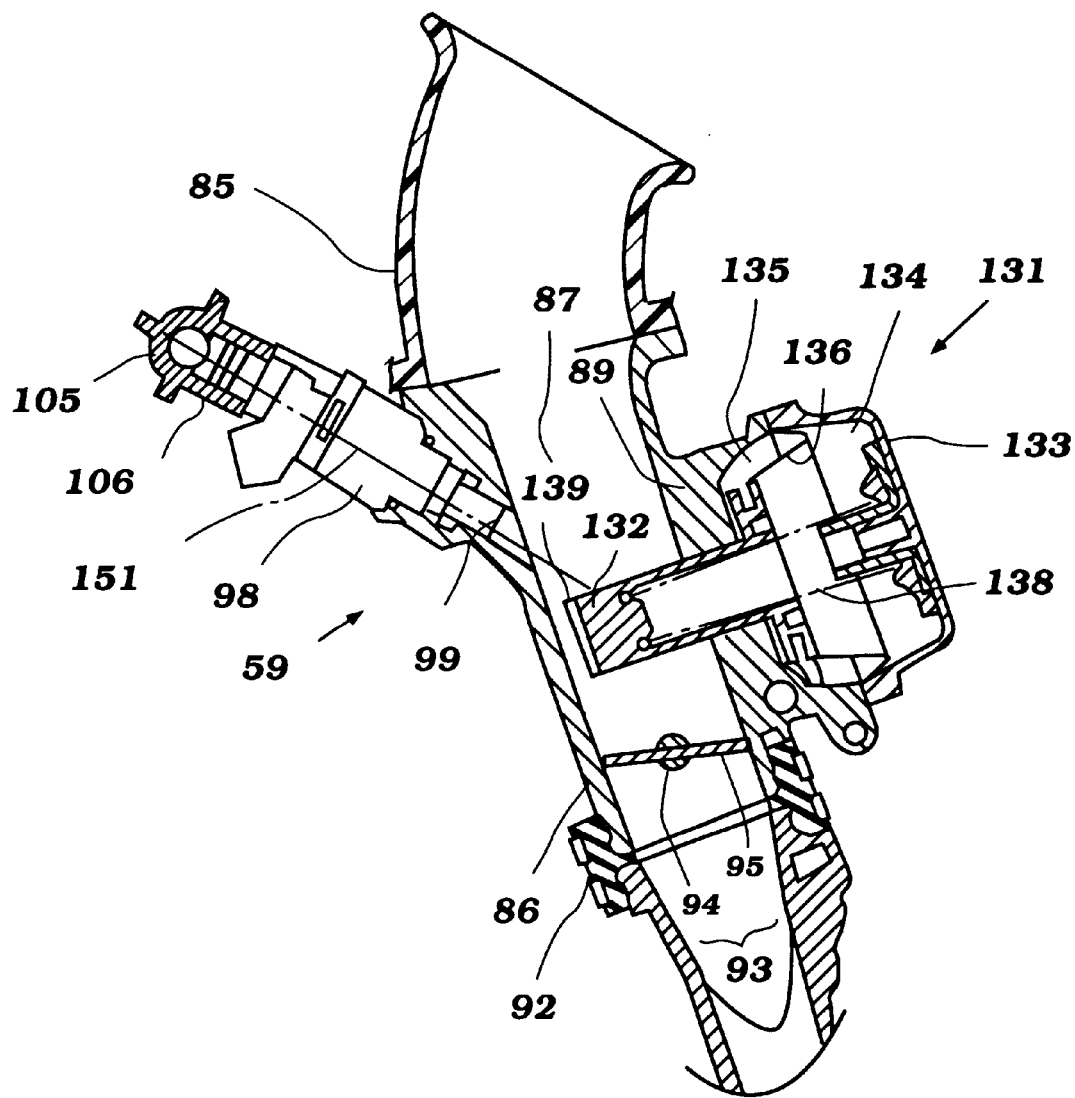
FIG. 19 is a cross-sectional view, in part similar to FIGS. 6, 14, 16, 17 and 18, and shows a still further embodiment of the invention.

FIG. 19 shows yet another embodiment that utilizes the buffer valve piston 132 as the impingement surface. In this embodiment, however, the injector nozzle axis 151 is positioned in an upstream location so that it will spray downwardly toward the backside of the buffer valve piston. As the piston opens, the spray will then impinge upon the end 139. In any event, the spray will be well dispersed and will enter the combustion chamber on the cycle for which the injection has been determined.

Figure 20:
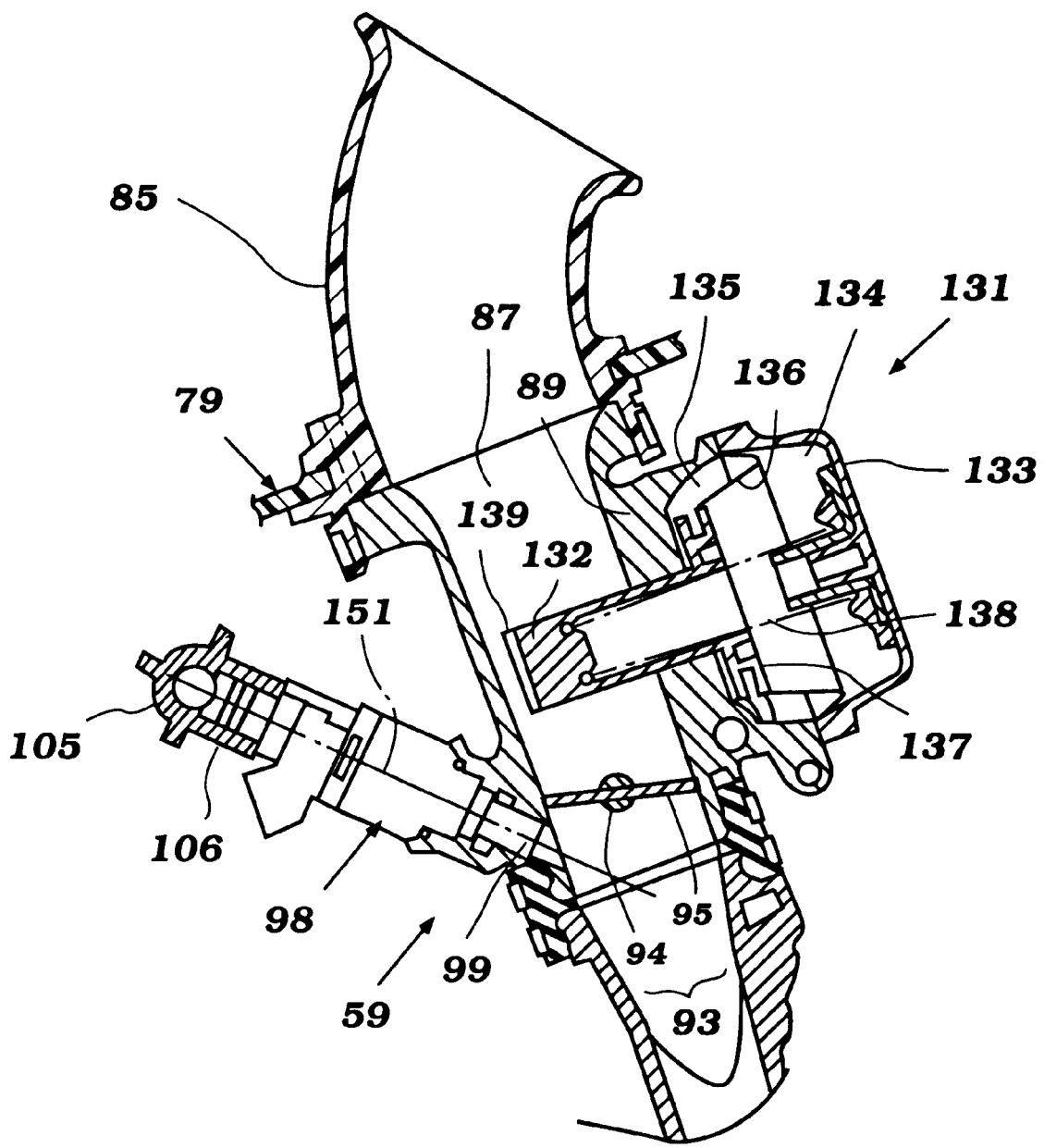
FIG. 20 is a cross-sectional view, in part similar to FIGS. 6, 14, 16, 17, 18 and 19, and shows yet another embodiment of the invention.

FIG. 20 shows a final embodiment of this series. In this embodiment, the injector 98 is positioned so that its axis 151 extends transversely to and downstream of the throttle valve plate 95 when in its idle position. This system will not have quite the beneficial affects of those previously described, because any spray that impinges on the walls will impinge on the walls of the cylinder head intake passage 57. However, the substantially vertical position of this passage will assist in ensuring that the fuel goes into the combustion chamber.

Figure 21:
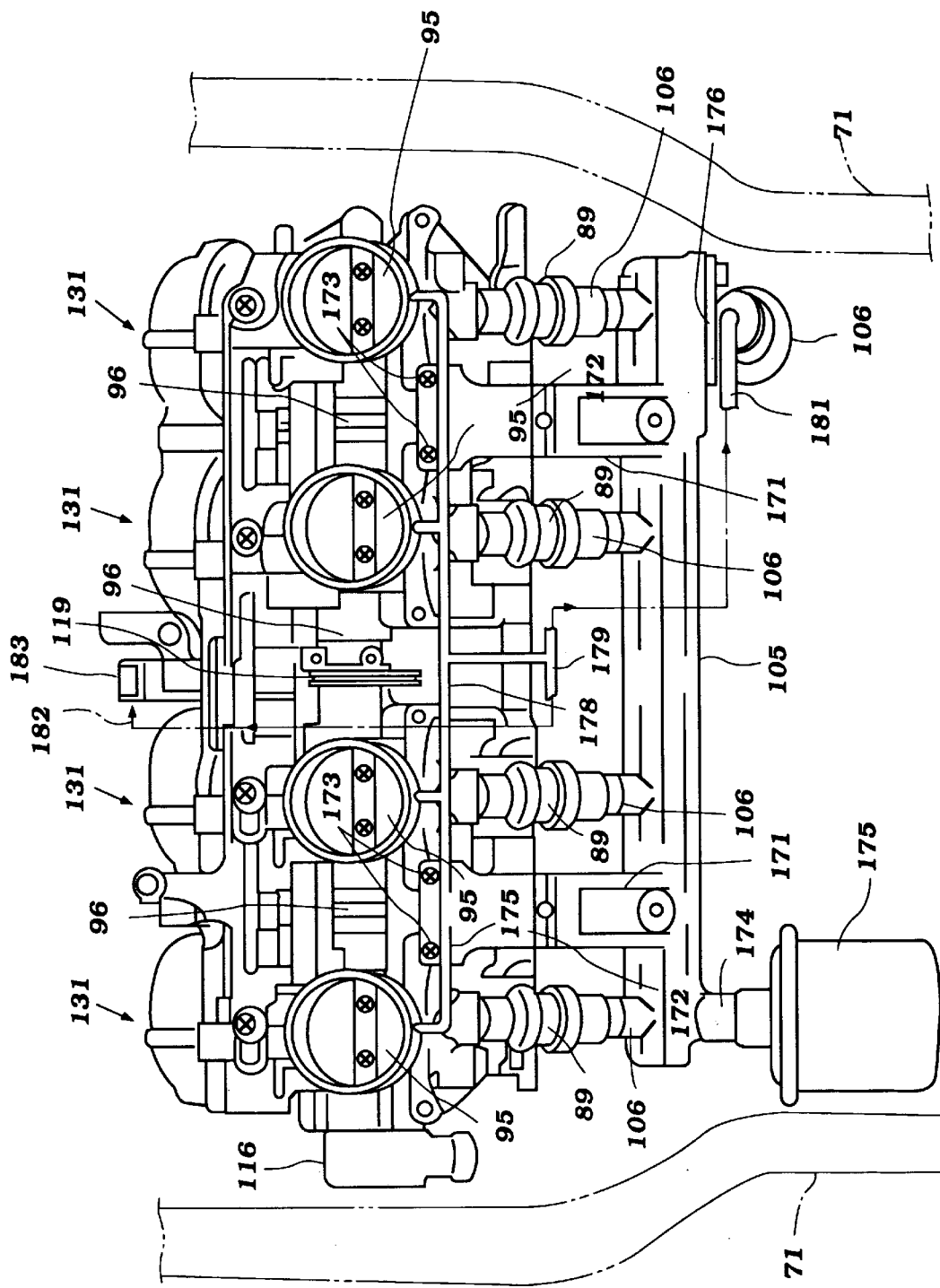
FIG. 21 is a view looking generally in the same direction as FIG. 3 but shows the cylinder head and other removed components for a still further embodiment of the invention.
Figure 22:
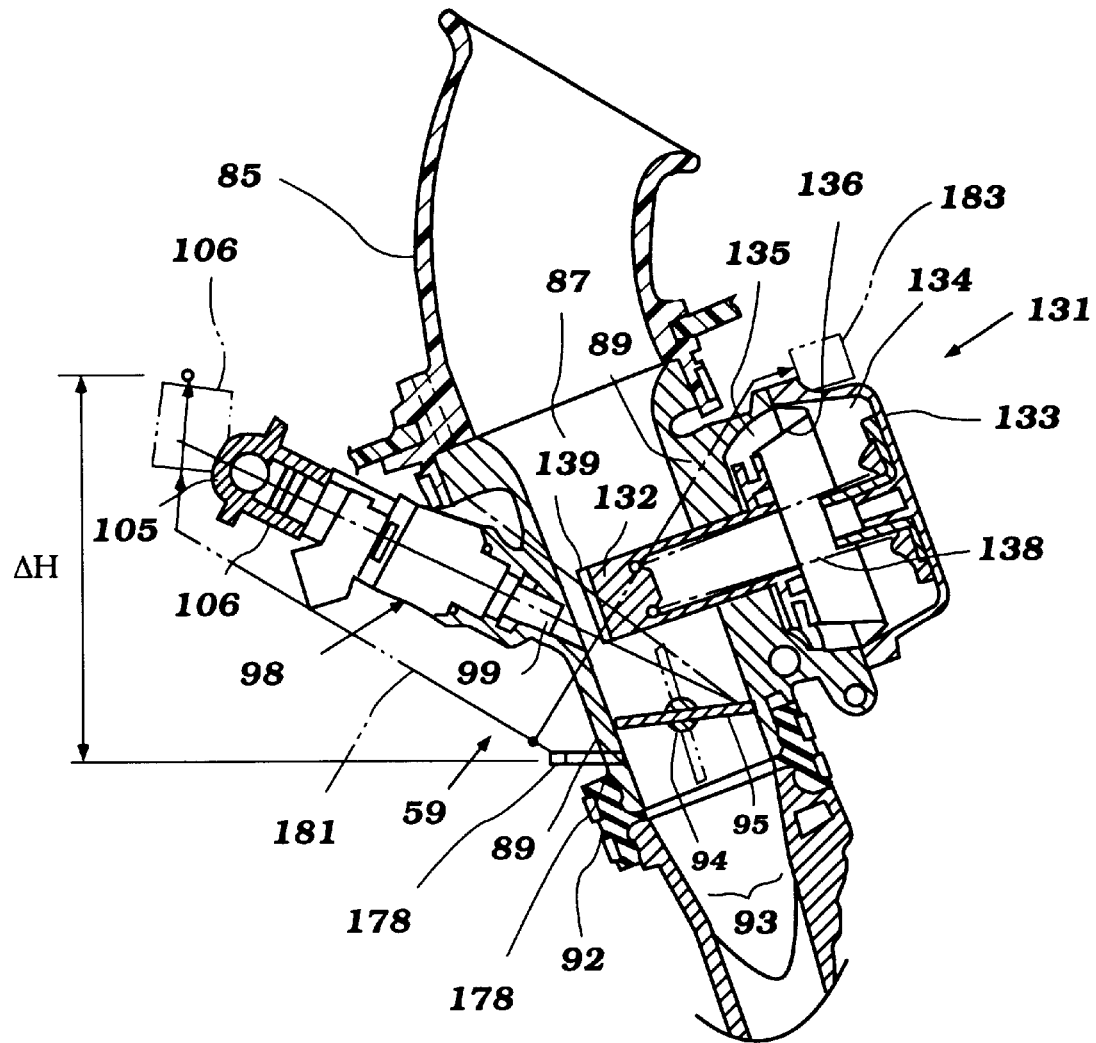
FIG. 22 is a cross-sectional view, in part similar to FIGS. 6, 14, 16, 17, 18, 19 and 20, and shows yet another embodiment of the invention.

Embodiment of FIGS. 21 and 22

FIGS. 21 and 22 show another embodiment of the invention which in many ways is similar to or the same as the embodiment of FIG. 17. For this reason, components of this embodiment which are the same as those of that previously described embodiment have been identified by the same reference numerals. However, many of the components associated with the system previously described have been illustrated in a rather schematic fashion.

This embodiment illustrates a specific physical embodiment and illustrates how certain of the components can be associated with each other and mounted in such a way so as to provide a more rigid unitary assembly between the separate throttle bodies 86. That is, in this embodiment, as will become apparent, the components are rigidly affixed to each other in a way that will permit removal of the entire throttle body assembly, including all of the throttle bodies 89, the fuel injectors 98, and the fuel rail 105. Therefore, these components, including certain other components associated with them, will be described in more detail, as well as illustrating the relationship to the components of the motorcycle which have been previously identified.

Referring first to FIG. 21, which is an underside view of the fuel supply system and shows the arrangement with the throttle bodies 89 removed as a unit from the engine. It will be seen that the fuel rail 105 is provided with a pair of bosses 171 that are affixed rigidly to retaining brackets 172. The retaining brackets 172 are, in turn, affixed to the pairs of throttle bodies 89 by means of threaded fasteners 173. As a result, the entire throttle body assembly is held together through this interconnection with the fuel rail 105.

In addition, and as shown in detail in this figure, the association of certain components with the fuel rail 105 which were depicted only schematically in FIG. 1, are shown in more detail. As seen in this figure, one end of the fuel rail 105, and preferably the delivery end thereof, is provided with a fitting 174 that receives a canister type fuel filter 175 through which fuel is delivered to the fuel rail 105.

At the other end of the fuel rail, the pressure regulator 106 is mounted, and it is mounted on a mounting bracket 176 and communicates with the interior of the fuel rail 105 so as to regulate the pressure therein.

In this embodiment also, the fuel pressure is regulated so as to be at a predetermined differential in pressure above the area in the induction passage into which the fuel is dispersed. Therefore, there is provided in the throttle bodies 89 at a point downstream of the idle positions of the throttle valves 95, a pressure pickup point 177.

There is such a pressure pickup point associated with each of the throttle bodies 177, and these pressure pickup points communicate with a common balance passage 178. This balance passage 178 has a T fitting 179 that provides a first connection, shown schematically in FIG. 22, and actually in FIG. 21, at 181 to the pressure regulator 106. This connection provides a connection so that the air pressure in the intake system downstream of the throttle valve 95 and where the fuel is supplied will be transmitted to the pressure regulator 106. The pressure regulator 106 therefore maintains a predetermined pressure difference between the fuel pressure and the air pressure in this region. This assists in maintaining uniform and the desired fuel air ratio.

It has also been noted that the diaphragm chamber 134 of the buffer valve 131 is exposed to the downstream pressure in the intake passage. This connection also is provided from the balance manifold 178. Therefore, the T fitting 179 has another connection or conduit 182 that goes to a combined tap and pressure sensor 183. This pressure sensor 183 not only supplies the air pressure signal to the buffer valve chamber 134, but also supplies an output signal to the ECU 117 so as to permit the intake system pressure to be used as one of the control parameters for both fuel injection timing and amount, and spark timing. Again, this mounting in close proximity to the throttle bodies assures that the conduits that transmit the signal can be kept quite short in length.

It will be seen that the positioning of these components is such that the height ΔH between the manifold 178 and the pressure regulator 106 is kept relatively large. In this embodiment, there is a head difference of approximately 150 millimeters. This reduces the likelihood that fuel vapors will reach the pressure sensors It should be noted that the physical construction of this embodiment may be utilized with any of the types of constructions previously described and, in fact, with all of these embodiments, so as to provide a very effective and compact control system.

Figure 23:
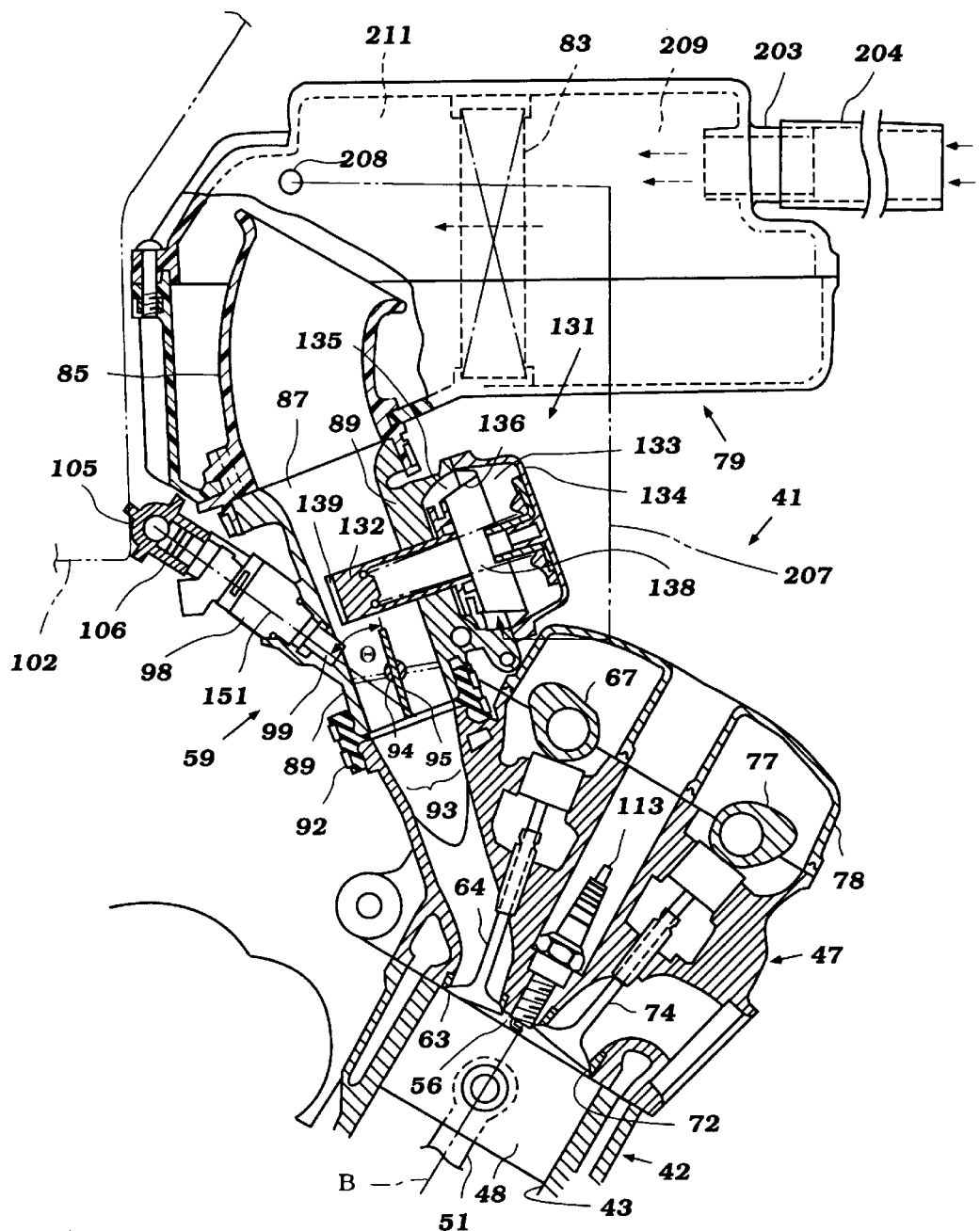
FIG. 23 is a cross-sectional view, in part similar to FIGS. 2, 6, 14, 16, 17, 18, 19, 20 and 22, and shows a still further embodiment of the invention.
Figure 24:
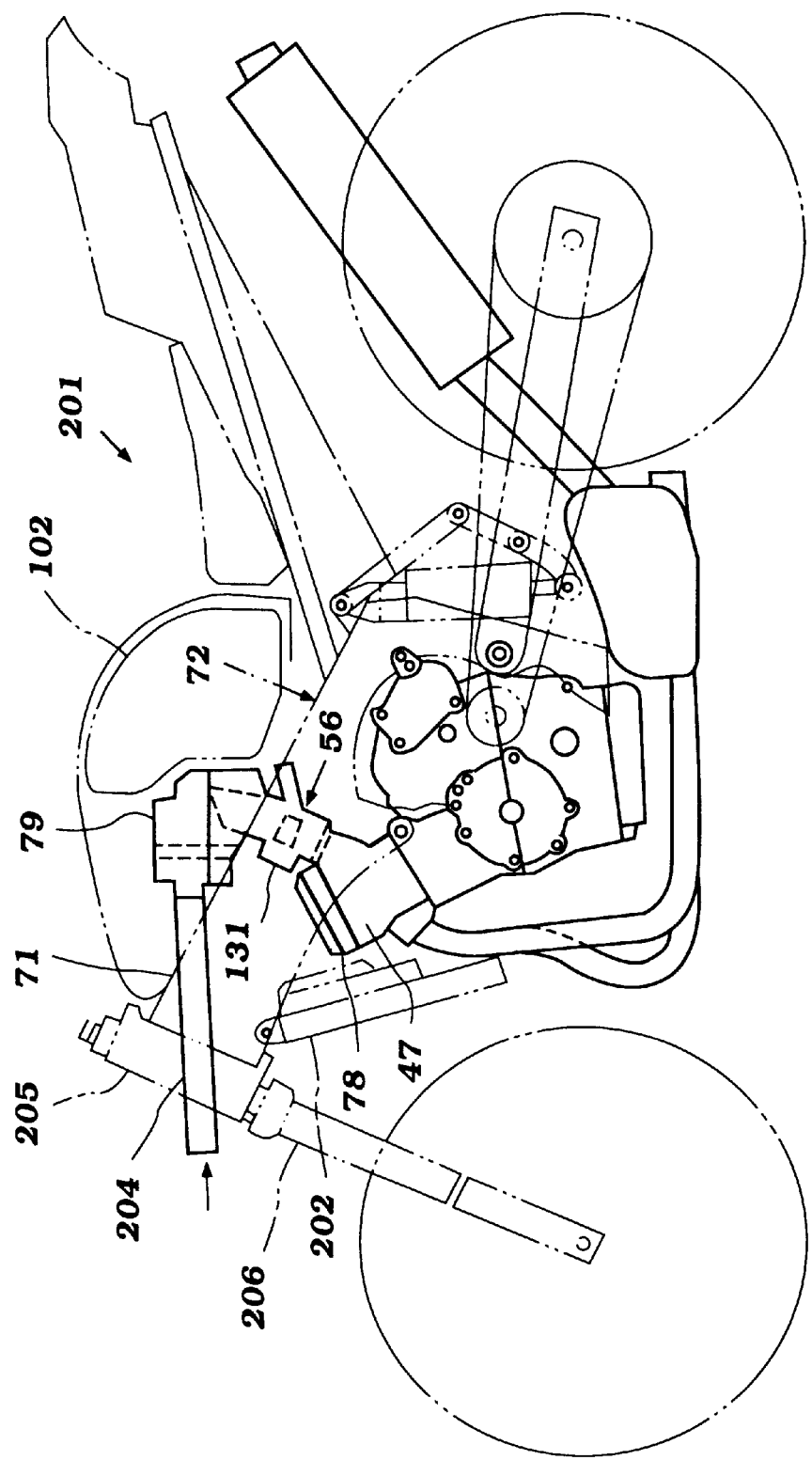
FIG. 24 is a view showing a complete motorcycle incorporating an engine as shown in the embodiment of FIG. 23.

Embodiment of FIGS. 23 and 24

FIGS. 23 and 24 show another embodiment of the invention which is basically similar to the embodiment of FIG. 16. For that reason, components of this embodiment which are the same as that embodiment have been identified by the same reference numerals and will not be described again, except insofar as is necessary to understand the construction and operation of this embodiment.

However, FIG. 24 shows more details of the associated motorcycle, which is indicated generally by the reference numeral 201, and the association of the engine with the motorcycle 201 will be described in more detail by particular reference to that figure.

As may be best seen in FIG. 24, the engine 41 is mounted in the frame assembly 72 of the motorcycle so that the cylinder block 42 and cylinder head 47 are inclined from a vertical plane in a forward direction. This has the advantage of placing the induction system 56 so that the intake passages, including the throttle body passage 87, extend in a generally vertical upward direction. This permits the air inlet device 79 to be positioned in a shielded place, and also one that is fairly high and clear of such auxiliaries as the radiator 202 for the cooling system of the engine 41.

In this embodiment, the air inlet device 79 has a forwardly facing air inlet opening 203 that is connected to a ram type inlet tube 204 that extends forwardly to a position somewhat in front of a headpipe 205 of the frame assembly 72. This headpipe 205 is connected to the main frame member 71 in a known manner, and dirigibly supports the front wheel and fork assembly 206. Thus, ram air will be delivered to the induction system.

It has also been noted that the atmospheric chamber 135 of the buffer valve assembly 131 is exposed to atmospheric pressure. FIG. 23 shows how this can be accomplished. There is provided a conduit 207 that extends from the chamber 135 to an inlet opening 208 in the air inlet device 79.

The air filter element 83 divides the interior of the air inlet device 79 into an upstream side 209 with which the inlet 203 connects and in a downstream side 211. Since the actual air inducted may be at a lower pressure than that on the upstream side due to potential flow resistance of the air filter element 83, the conduit 207 communicates with this downstream side 211 so as to provide a more accurate air pressure signal.

Aside from this difference, the construction of this embodiment is the same and embodies those features which have already been described and which need not be repeated here.

Figure 25:
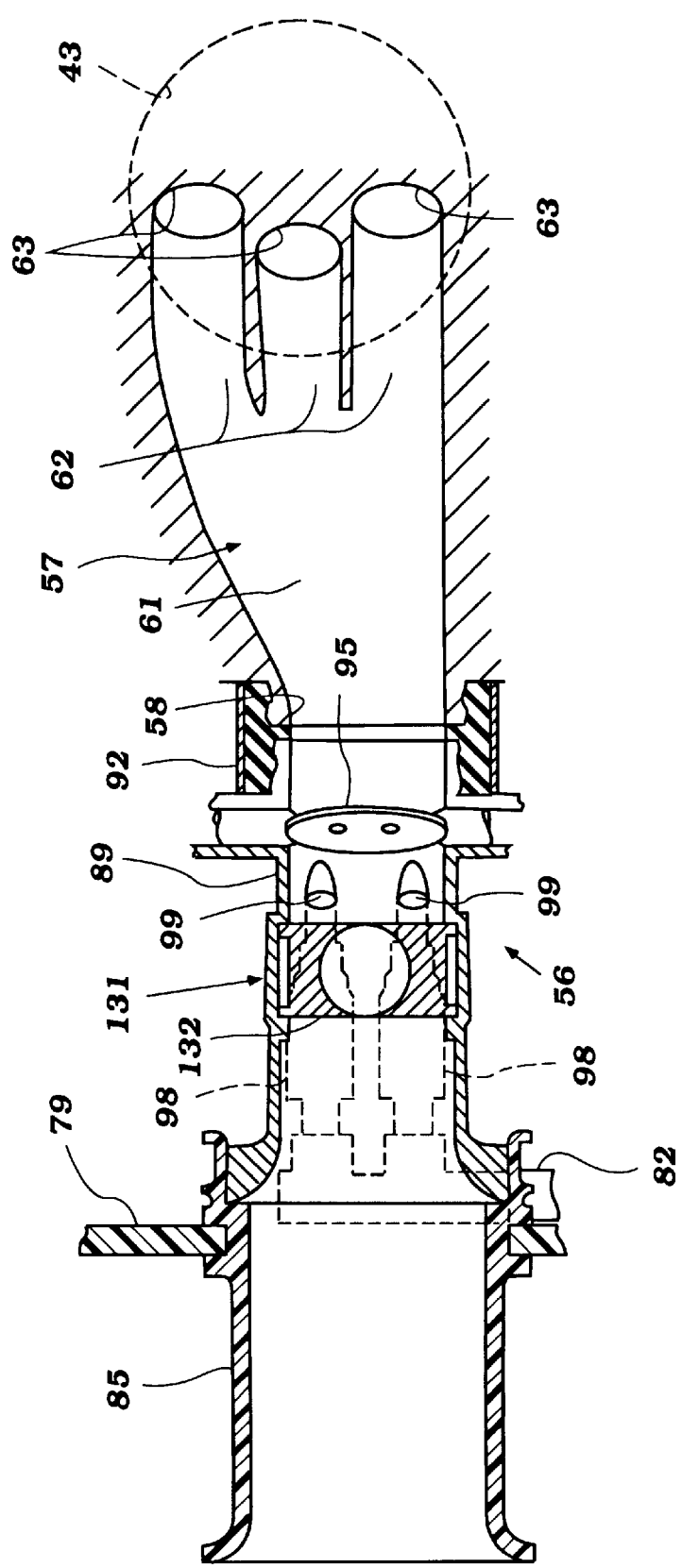
FIG. 25 is a cross-sectional view, in part similar to FIGS. 8 and 15, showing a still further embodiment of the invention.

Embodiment of FIG. 25

FIG. 25 is a single view which depicts an embodiment which is generally similar to the embodiment of FIGS. 14 and 15. This embodiment differs from that embodiment only in that it is provided with two rather than one fuel injector.

The injectors 98 are mounted so that their nozzle portions 99 are in side-by-side relationship and directed toward the throttle valve 95 in the manner described in conjunction with the previous embodiment. For that reason, and because of the otherwise general similarities of this embodiment to that embodiment, further description of this embodiment is not believed to be necessary so as to permit those skilled in the art to practice the invention.

Figure 26:
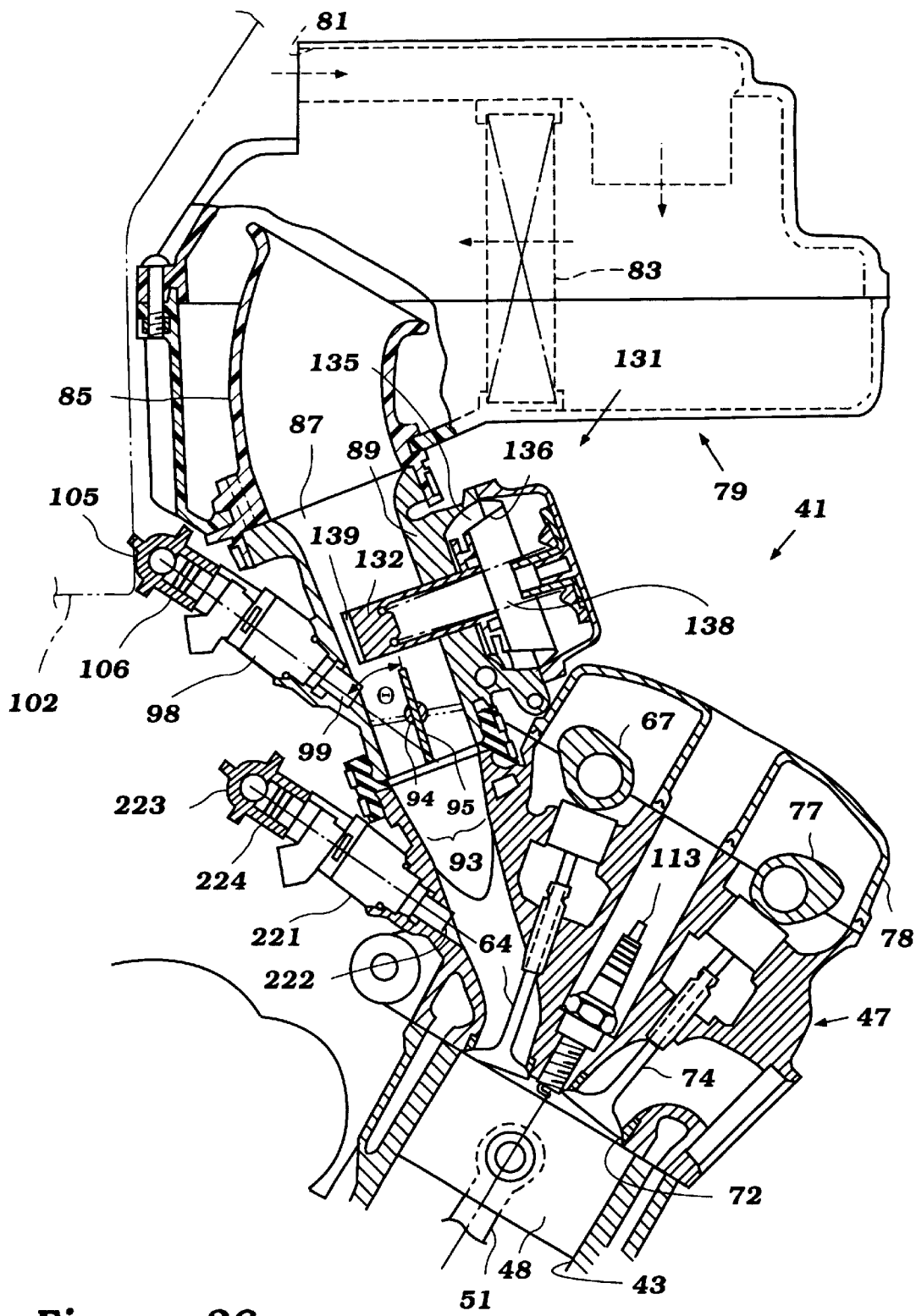
FIG. 26 is a cross-sectional view, in part similar to FIGS. 2, 6, 14, 16, 17, 18, 19, 20, 22 and 23, showing a still further embodiment of the invention.

Embodiment of FIG. 26

FIG. 26 is an embodiment which is generally the same as the embodiment of FIG. 16, and thus, all of the components are identified by the same reference numerals as with that previously described embodiment.

This embodiment, like the embodiment of FIG. 25, however, uses two fuel injectors for each cylinder. The use of two fuel injectors permits more accurate control and can more easily satisfy the full fuel range requirements for the engine. That is, such an arrangement can be tailored so that each injector need inject only a maximum amount of fuel which is less than the total maximum required by the engine for maximum output. Thus, more precise control can be achieved. One injector can inject fuel for the low-speed and low-load running, and that injector, coupled with the other injector, can serve the high-speed high-load requirements.

In this embodiment, an injector 98 is mounted in the throttle body 89, as with the embodiment of FIG. 16.

In addition, this embodiment includes a second injector 221 that is mounted in the cylinder head assembly 47 and which has its discharge nozzle 222 in registry with a particular one of the intake passage portions 62. This injector 221 is provided with a separate fuel rail 223 that has individual nipples 224 for connection to each injector 221. A similar fuel supply system may be provided for the fuel rail 223 to that which has already been described.

Under low-speed and low-load conditions, the injector 98 will supply the fuel requirements. As the load and speed increases, the injector 221 can begin to inject fuel so as to supplement the supply from the injector 98 and satisfy the full loads and full speed requirements of the engine 41.

Figure 27:
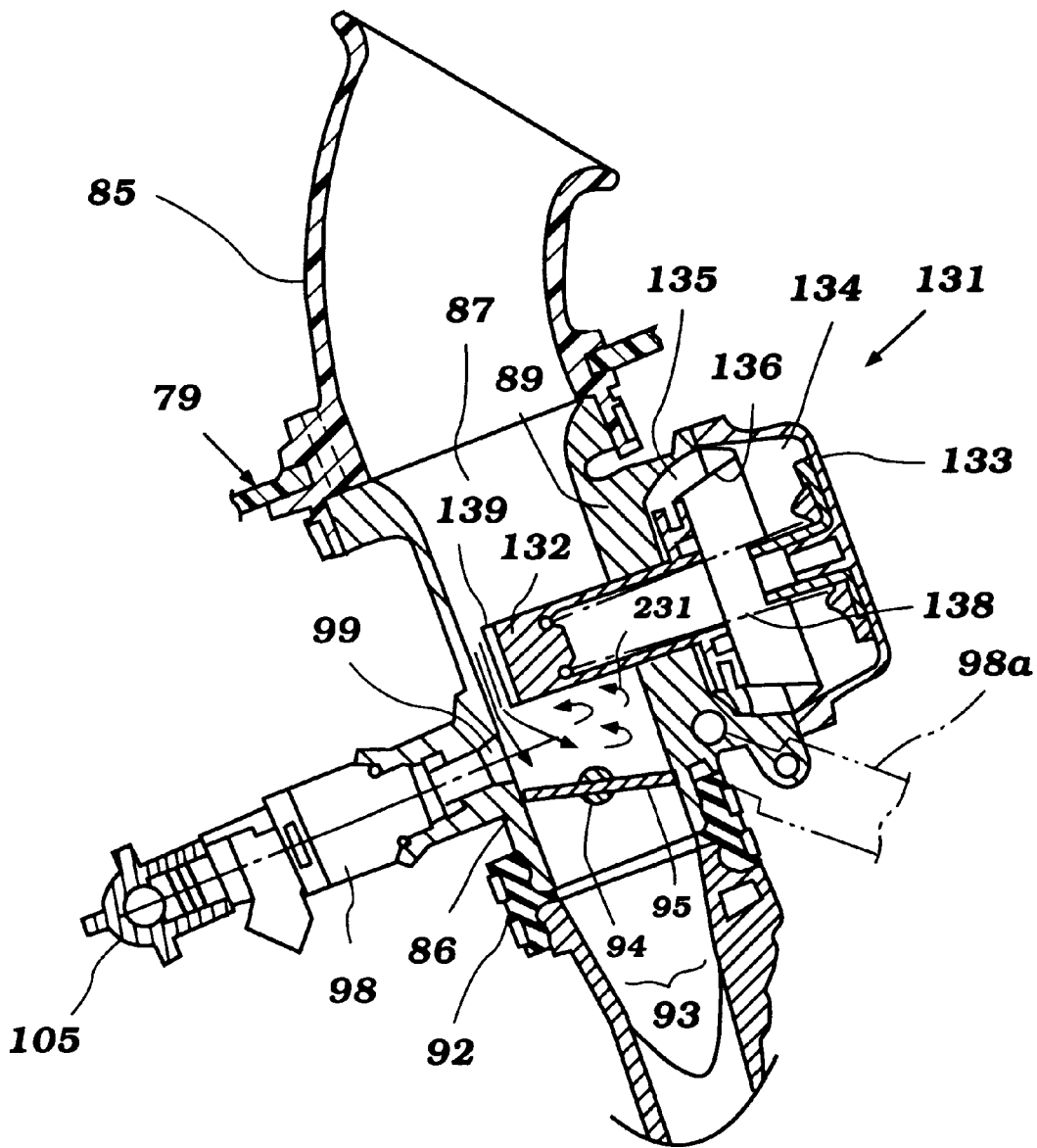
FIG. 27 is a cross-sectional view, in part similar to FIGS. 6, 14, 16, 17, 18, 19, 20, 22, 23 and 26 of another embodiment of the invention.

Embodiments of FIG. 27

In substantially all of the embodiments as thus far described, the fuel injectors 89 have been positioned so as to spray on either the throttle valve plate 95 and/or on the buffer valve. The reason this was done was to ensure that the fuel would not impinge upon the walls that define the induction passage into which the fuel is injected.

However, there is another way of achieving this result. This is by utilizing what is referred to as the Karman vortex. This is a turbulent area that occurs behind a body that protrudes into an air stream. For example, and considering specifically the structure shown in FIG. 27, the area downstream of the buffer piston 132 will cause a Karman effect, wherein there are eddy currents generated as indicated by the arrows 231.

Hence, in this embodiment, the fuel injector 98 is mounted so that its nozzle portion 99 is directed into the area where these eddy currents 231 occur. Thus, it is not necessary for the fuel from the injector 98 to actually impinge upon a member, but can impinge in an area where turbulence exists so as to ensure that the fuel will be well vaporized and mixed. Also, by injecting into this area, it will be ensured that the fuel will not impinge on the wall of the throttle body 89.

An alternate injector location is also shown in this embodiment and is identified by the reference numeral 98a. In this embodiment, the injector 98a is positioned beneath the buffer valve 131 and sprays upwardly toward the backside of the piston 132. However, the turbulence generated by the vortices 231 will substantially prevent impingement of the fuel on the piston 132. Any fuel that does impinge on the piston, however, will be rapidly dissipated because of the high air flow velocity in this area.

Figure 28:
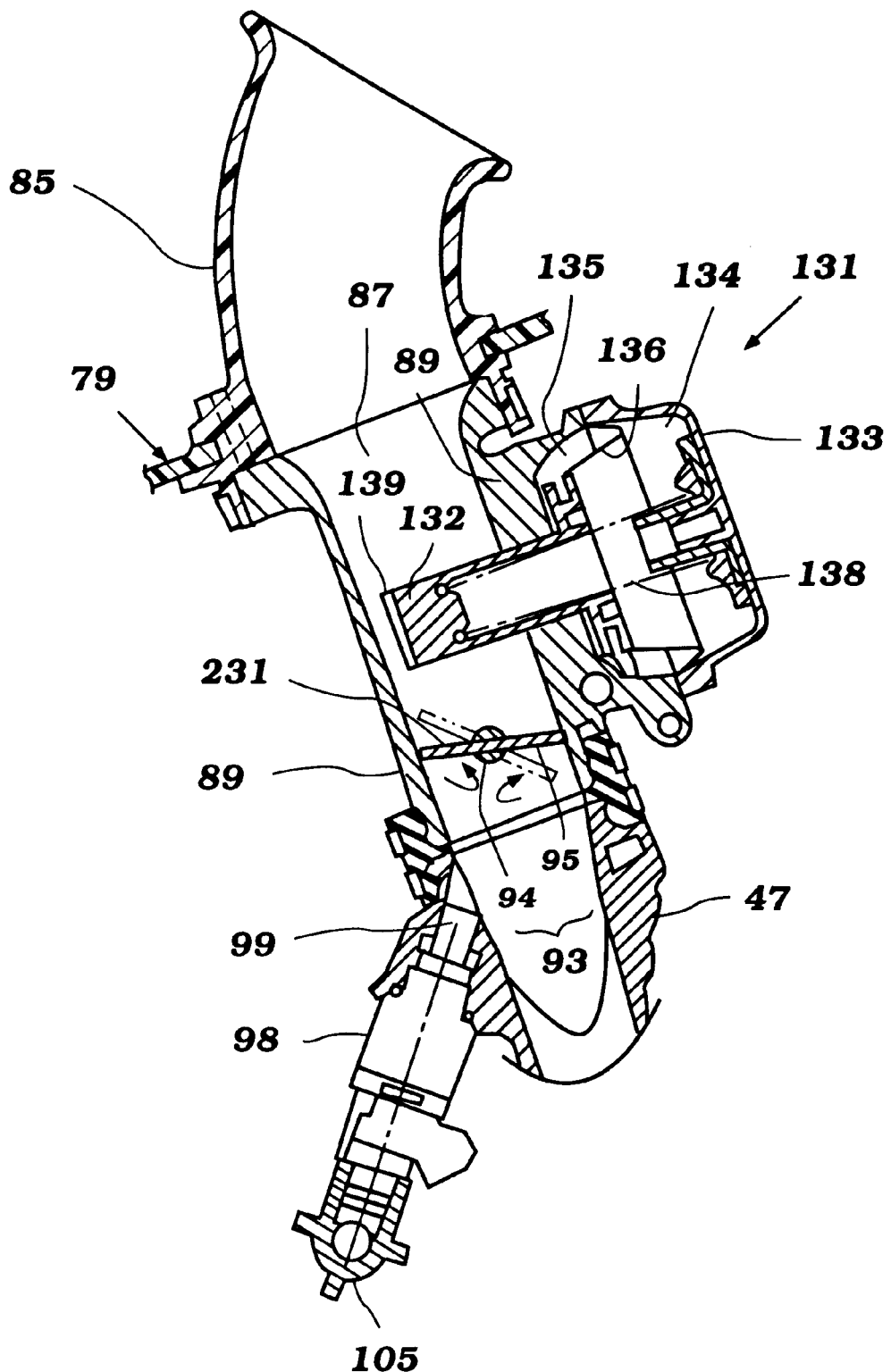
FIG. 28 is a cross-sectional view, in part similar to FIGS. 6, 14, 16, 17, 18, 19, 20, 22, 23, 26 and 27 of a yet further embodiment of the invention.

Embodiment of FIG. 28

FIG. 28 illustrates another embodiment of the invention that utilizes the Karman effect, so as to improve fuel dispersion. In this embodiment, the fuel injector 98 is mounted actually in the cylinder head assembly 47 in a direction so that its nozzle port 99 sprays upwardly toward the backside of the throttle valve assembly 93. As the throttle plate 95 moves open, vortices, indicated again by the reference numerals 231, will be formed. The fuel is sprayed into these vortices 231 so as to improve dispersion. Any fuel which may not be dispersed will impinge on the throttle valve plate 95 and be dispersed by the air flow across it.

Figure 29:
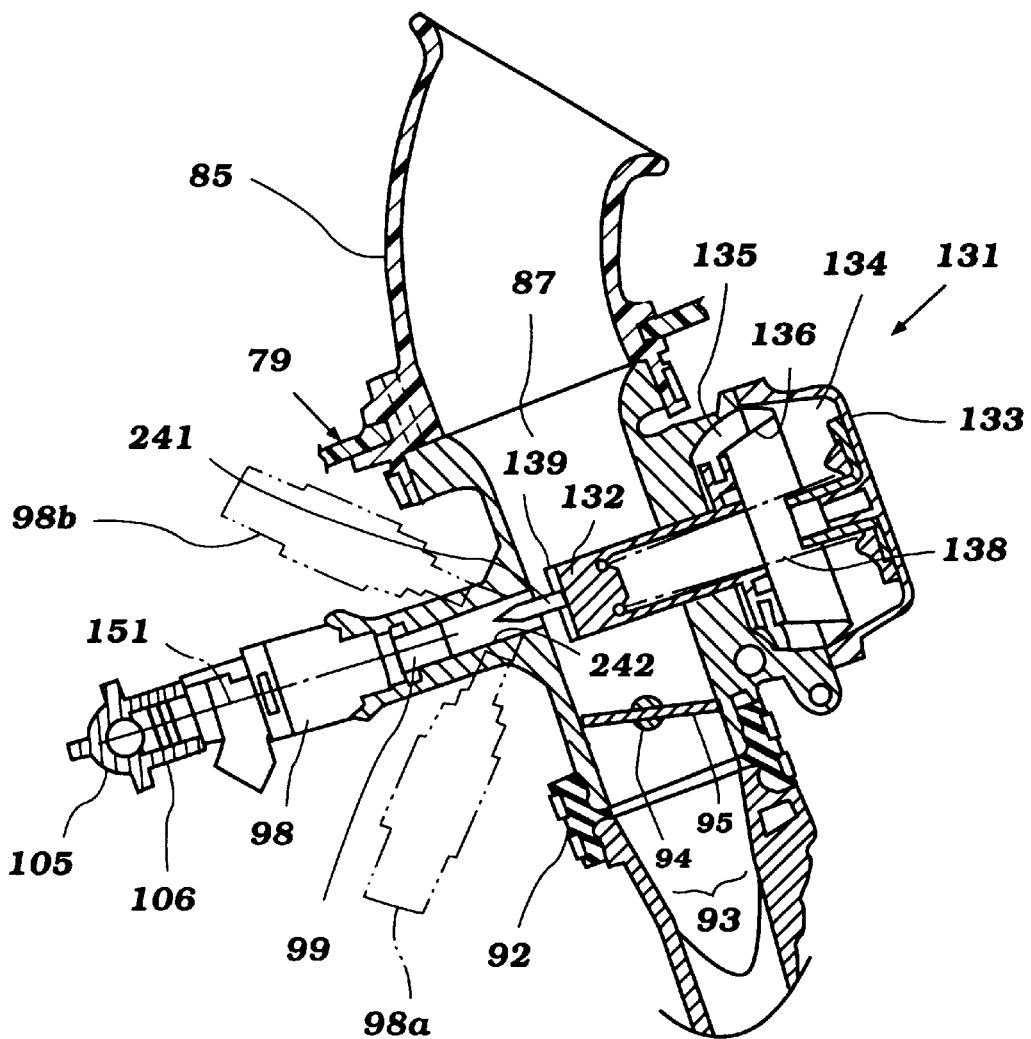
FIG. 29 is a cross-sectional view, in part similar to FIGS. 6, 14, 16, 17, 18, 19, 20, 22, 23, 26, 27 and 28 of still another embodiment of the invention.

Embodiments of FIG. 29

FIG. 29 shows other embodiments of the invention, which are, in part, similar to the embodiment of FIG. 18, in that the fuel injector 98 is disposed so that the spray axis 151 of its nozzle portion 99 is directed toward the head of the buffer piston 132, and specifically the end area 139 thereof. However, in this embodiment, the buffer piston is provided with a needle-like projection 241 which in the closed position extends into a passageway 242 formed at the end of the throttle body that receives the fuel injector nozzle portion 99.

This needle-like projection 241 will form an additional surface area onto which fuel can be deposited, and will also act so as to more finely divide the fuel spray from the nozzle 99. Thus, this provides a surface across which rapid air flow takes place to aid in disbursement and also will mechanically disperse the fuel.

In the solid line embodiment of this figure, the axis 151 is substantially coaxial with the needle-like portion 241. However, angled locations are also possible, as shown at 98a and 98b. These arrangements will also provide the desired effect.

Figure 30:
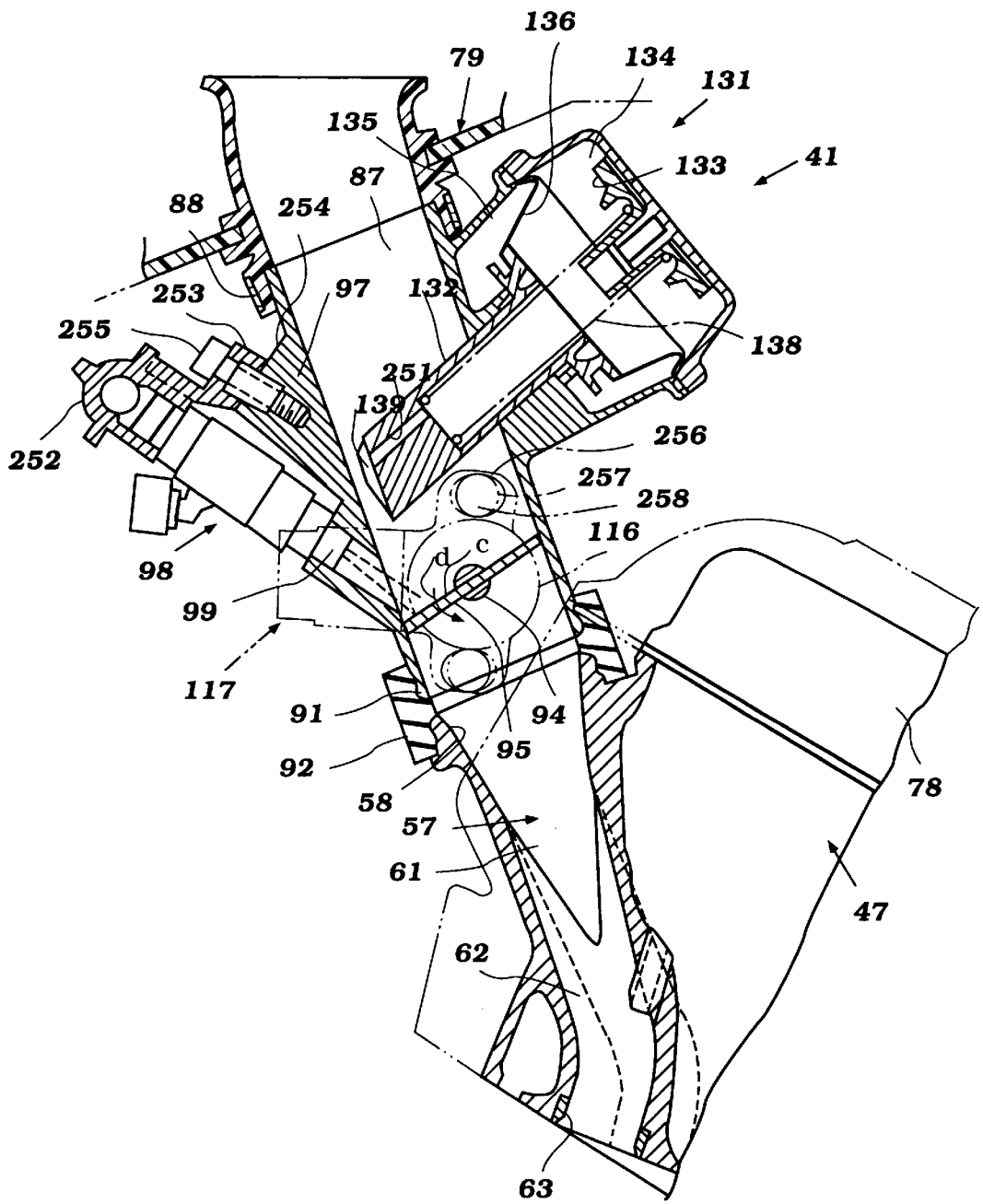
FIG. 30 is a cross-sectional view, in part similar to FIGS. 2, 6, 14, 16, 17, 18, 19, 20, 22, 23, 26, 27, 28 and 29 showing still another embodiment of the invention.

Embodiment of FIG. 30

FIG. 30 is a single view of a further embodiment of the invention, which is generally the same as the embodiment of FIG. 14. However, this embodiment shows several different features, including a different way of attaching the fuel rail to the throttle bodies to provide a unitary assembly. Thus, components of this embodiment which are the same as the embodiment of FIG. 14 have been identified by the same reference numerals, and will not be described again, except insofar as is necessary to understand the construction and operation of this embodiment.

In this embodiment, the buffer valve 131 has a slightly different construction that those previously described. This deals with the way in which the intake system pressure is transmitted to the chamber 134 of this device. In this embodiment, the sliding piston 132 has a passageway 251 that extends from the recessed end area 139 into the hollow interior of the piston 132 and terminating within the chamber 134. This permits the pressure in the intake passage where fuel is injected to be transmitted to the chamber 134. The chamber 135 is exposed to atmospheric pressure, in any of the manners already described.

It should be noted that this embodiment also places the sliding piston 132 at an angle relative to the flow axis of the passage 87. This is done so as to provide a somewhat better pressure signal and better control.

In this embodiment, the fuel rail, indicated generally by the reference numeral 252, has flange portions 253 that lie adjacent and are abuttingly engaged with the throttle body projection 97, and specifically a shoulder 254 thereof. Threaded fasteners 255 pass through these flange portions 253 and affix the fuel rail 252 not only to the injectors 98, but also the throttle bodies 89, so as to provide a more rigid assembly therebetween.

Also, as shown in more detail in this figure, the throttle position sensor 116 is illustrated in more physical detail so as to show how it can be adjusted to provide a desired null setting. The sensor 116 has a pair of tabbed end portions 256 which are formed with slotted openings 257 that pass threaded fasteners 258. By loosening slightly the threaded fasteners 258, it is possible to rotate the housing 256 in the direction of the arrows C around the axis of the throttle valve shaft 94 so as to provide the desired initial setting.

In this embodiment, the cylinder head is also formed with an elongated intake passage 57 so as to appropriately increase the volume between the throttle valve 95 and the intake port 63 so as to maintain the desired relationship with the exhaust volume of the combustion chamber.

Figure 31:
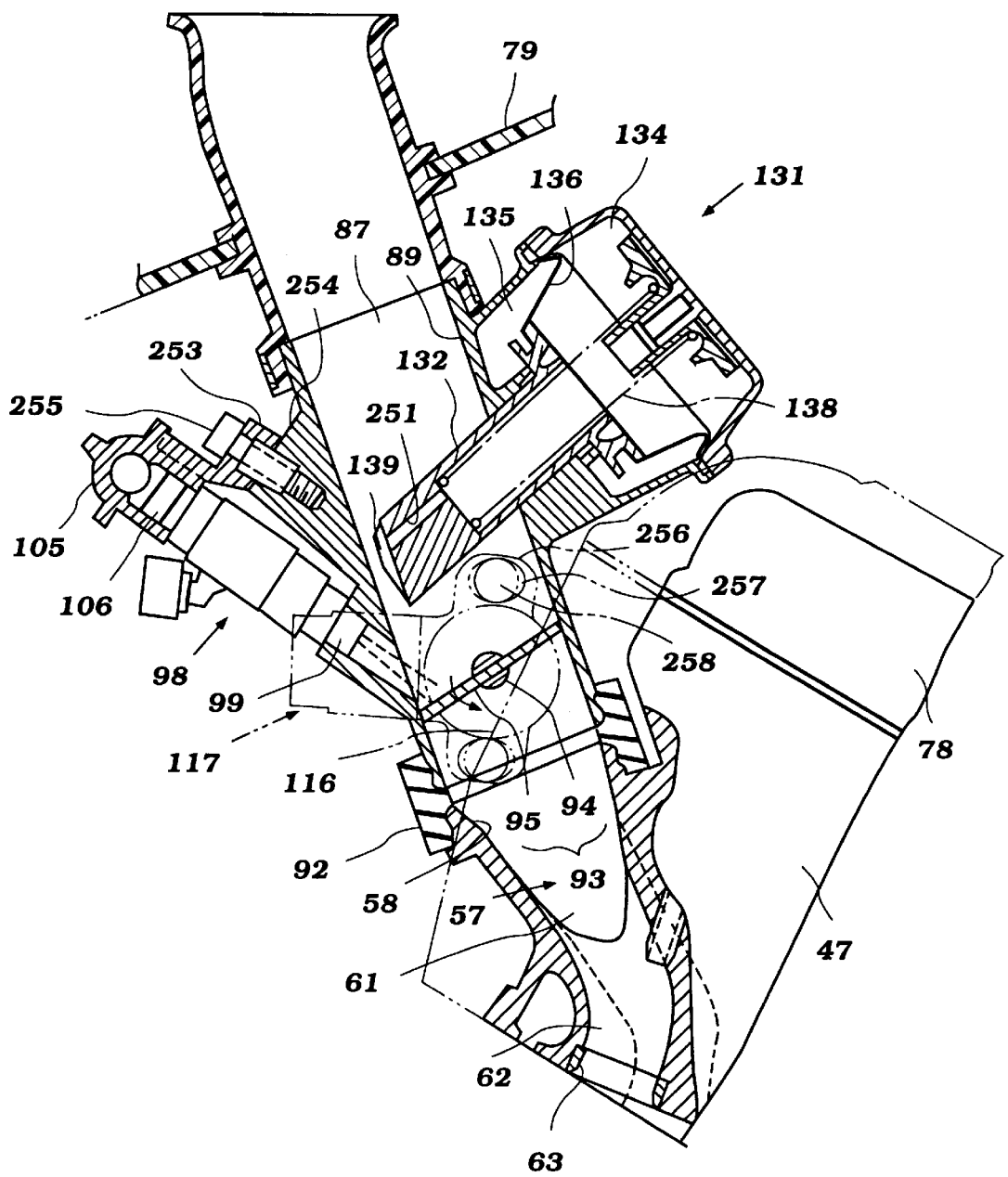
FIG. 31 is a cross-sectional view, in part similar to FIGS. 2, 6, 14, 16, 17, 18, 19, 20, 22, 23, 26, 27, 28, 29 and 30 showing still another embodiment of the invention.
Figure 32:
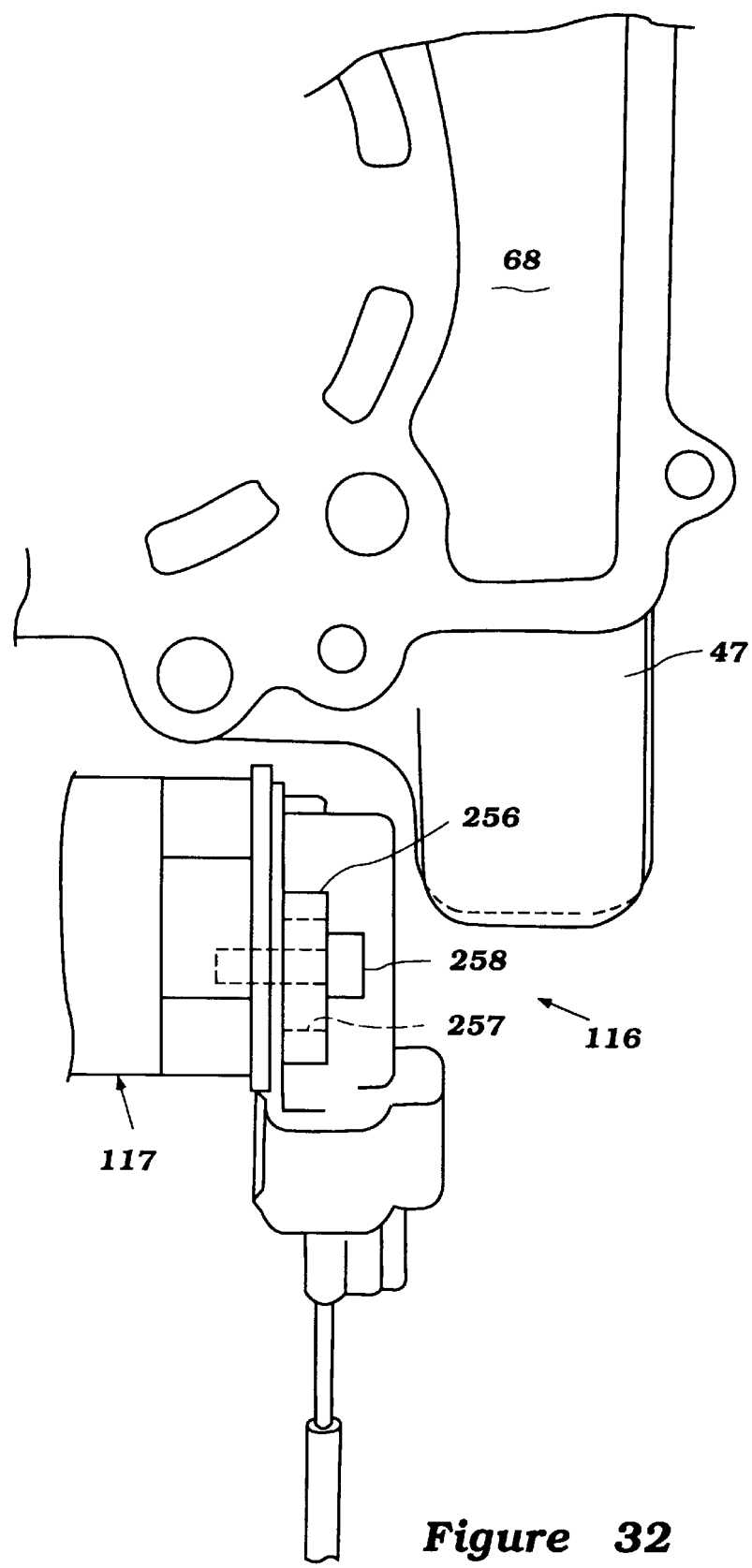
FIG. 32 is a top plan view showing the position of the throttle position sensor and control unit for the embodiment of FIG. 31.

Embodiment of FIGS. 31 and 32

FIGS. 31 and 32 show another embodiment which is basically the same as the embodiment of FIG. 30. However, FIG. 32 also shows more of the details of the mounting arrangement for the throttle position sensor 116. In addition, this shows an arrangement wherein there is a much shorter cylinder head intake passage 57. This difference in length is again done to maintain the desired ratio between the intake passage volume and the volume of the combustion chamber, or more specifically, the exhaust gas volume.

Figure 33:
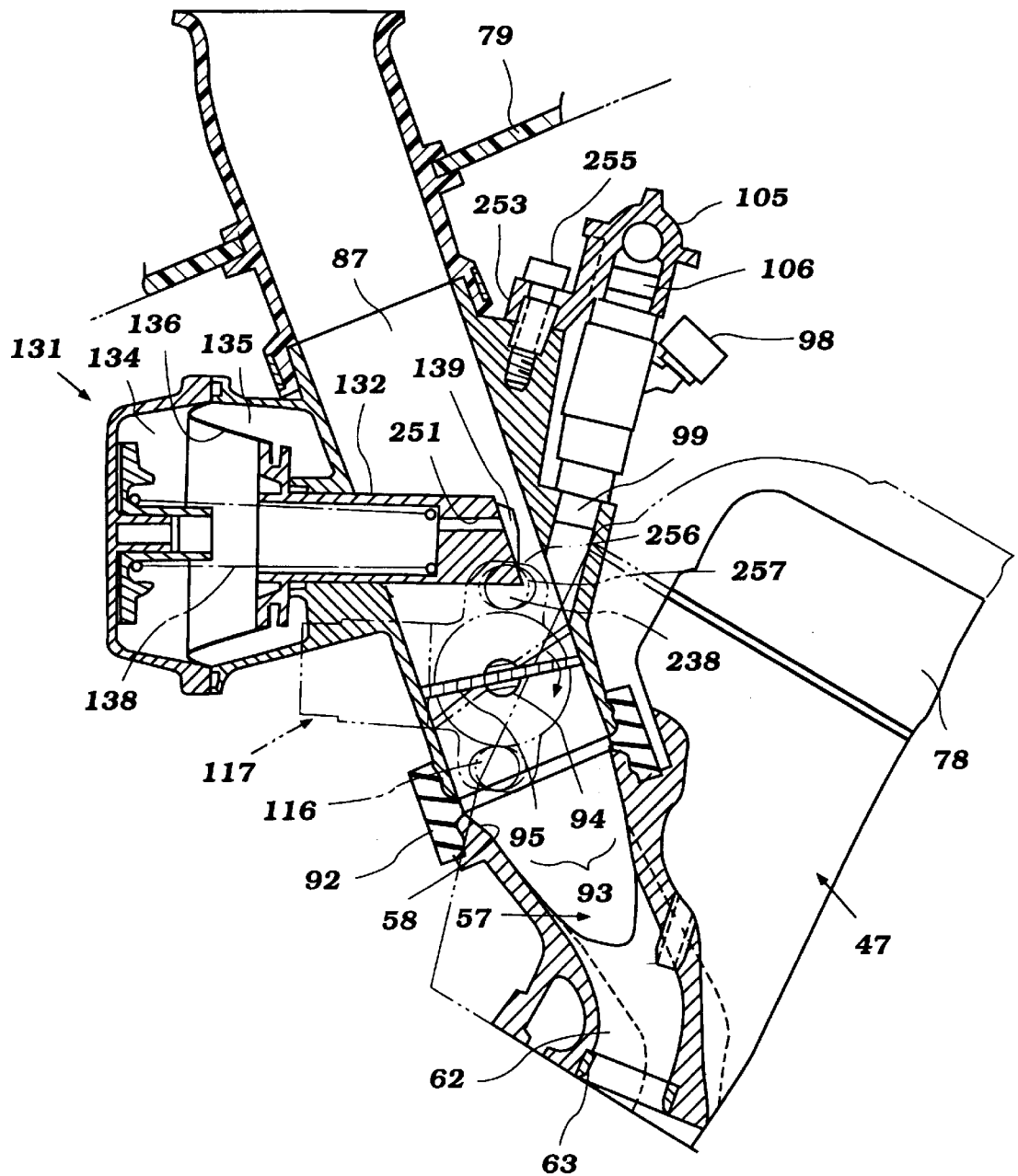
FIG. 33 is a cross-sectional view, in part similar to FIGS. 2, 6, 14, 16, 17, 18, 19, 20, 22, 23, 26, 27, 28, 29, 30 and 31 showing the final illustrated embodiment of the invention.

Embodiment of FIG. 33

FIG. 33 is another embodiment of the invention which is similar to the embodiments of FIGS. 30 and 31 and of FIG. 32. This embodiment differs from the previous embodiments in that the buffer valve 131 and location of the fuel injectors 98 is reversed. Aside from this reversal, and the difference in length of the intake passage 57, there are no other differences. Hence, further description of this embodiment is not believed to be necessary to permit those skilled in the art to practice the invention.

From the foregoing description, it should be readily apparent that the described embodiments of the invention provide very effective induction systems for an engine that facilitates combustion control by maintaining the desired volumetric relationship between the intake passage and the exhaust gas volume. Also, the constructions ensure good fuel vaporization and smooth engine running during throttle blipping. Furthermore, the described constructions, although they use separate throttle bodies for multiple cylinders, interconnect the throttle bodies, fuel injectors and fuel rails so as to provide a rigid sub-assembly. In addition, the sensor and control arrangement provides a simplified structure that minimizes external wiring and makes signal transmission more positive.

Of course, those skilled in the art will readily understand that the foregoing described embodiments are only preferred embodiments of the invention, and that various changes and modifications can be made without departing from the spirit and scope of the invention, as defined by the appended claims.

We claim:

1. An induction system for an internal combustion engine having at least a pair of relatively movable components that define a combustion chamber, said induction system supplying a charge to said combustion chamber, said induction system forming an intake passage in which a throttle valve is positioned, said intake passage communicating with said combustion chamber through an intake port, said throttle valve being positioned in close proximity to said intake port and controlling the flow only to said combustion chamber, a fuel injector for injecting fuel directly into said intake passage for only said combustion chamber and a buffer valve in said intake passage and which is opened by the flow therethrough only to said combustion chamber for restricting the air flow upon sudden changes in position in said throttle valve so as to maintain a more uniform air fuel ratio under transient conditions.

2. An induction system for an internal combustion engine as set forth in claim 1, wherein the buffer valve is a plate type valve.

3. An induction system for an internal combustion engine as set forth in claim 2, wherein the buffer valve is journalled for rotation on a buffer valve shaft.

4. An induction system for an internal combustion engine as set forth in claim 3, wherein the rotational axis of the buffer valve shaft is disposed at one side of the intake passage.

5. An induction system for an internal combustion engine as set forth in claim 1, wherein the buffer valve is a piston type valve.

6. An induction system for an internal combustion engine as set forth in claim 5, wherein the piston type buffer valve is controlled by a diaphragm motor.

7. An induction system for an internal combustion engine as set forth in claim 6, wherein the diaphragm motor is operated by differential pressure in said induction system.

8. An induction system for an internal combustion engine as set forth in claim 7, wherein the differential pressure comprises atmospheric pressure and pressure in the intake passage contiguous to the buffer valve.

9. An induction system for an internal combustion engine as set forth in claim 8, wherein said induction system includes a filter element and the atmospheric pressure is sensed downstream of said filter element.

10. An induction system for an internal combustion engine as set forth in claim 7, wherein the differential pressure comprises atmospheric pressure and pressure in the intake passage contiguous to the point where the fuel is injected.

11. An induction system for an internal combustion engine as set forth in claim 1, wherein the fuel injector injects fuel into the intake passage upstream of the throttle valve.

12. An induction system for an internal combustion engine as set forth in claim 11, wherein the fuel injector injects fuel into the intake passage downstream of the buffer valve.

13. An induction system for an internal combustion engine as set forth in claim 11, wherein the fuel injector injects fuel into the intake passage contiguous to the buffer valve.

14. An induction system for an internal combustion engine as set forth in claim 11, wherein the fuel injector injects fuel into the intake passage upstream of the buffer valve.

15. An induction system for an internal combustion engine as set forth in claim 1, wherein the fuel injector injects fuel onto at least one of the valves in at least one of its positions.

16. An induction system for an internal combustion engine as set forth in claim 15, wherein the fuel injector injects fuel onto the at least one of the valves in substantially all of its positions.

17. An induction system for an internal combustion engine as set forth in claim 15, wherein the at least one of the valves is a butterfly type valve having a valve shaft extending across the intake passage.

18. An induction system for an internal combustion engine as set forth in claim 17, wherein the fuel injector injects fuel onto the upstream side of the butterfly type valve when it is in a closed position.

19. An induction system for an internal combustion engine as set forth in claim 17, wherein the fuel injector injects fuel onto the downstream side of the butterfly type valve when it is in an open position.

20. An induction system for an internal combustion engine as set forth in claim 19, wherein the fuel injector also injects fuel onto the upstream side of the butterfly type valve when it is in a closed position.

21. An induction system for an internal combustion engine as set forth in claim 20, wherein the butterfly type valve comprises the throttle valve.

22. An induction system for an internal combustion engine as set forth in claim 15, wherein the at least one of the valves is a sliding piston type valve extending at varying distances into the intake passage.

23. An induction system for an internal combustion engine as set forth in claim 22, wherein the fuel injector sprays on the end of the sliding piston type valve.

24. An induction system for an internal combustion engine as set forth in claim 23, wherein the fuel injector sprays on the end of the sliding piston type valve in all positions thereof.

25. An induction system for an internal combustion engine as set forth in claim 24, wherein the fuel injector sprays on a needle like projection formed on the end of the sliding piston type valve.

26. An induction system for an internal combustion engine as set forth in claim 22, wherein the fuel injector sprays on the upstream side of the sliding piston type valve.

27. An induction system for an internal combustion engine as set forth in claim 26, wherein the fuel injector sprays on the upstream side of the sliding piston type valve when in a closed position and on the end thereof when in an opened position.

28. An induction system for an internal combustion engine as set forth in claim 22, wherein the fuel injector sprays on the downstream side of the sliding piston type valve.

29. An induction system for an internal combustion engine as set forth in claim 26, wherein the fuel injector sprays on the downstream side of the sliding piston type valve when in a closed position and on the end thereof when in an opened position.

30. An induction system for an internal combustion engine as set forth in claim 22, wherein the sliding piston type valve comprises the buffer valve.

31. An induction system for an internal combustion engine as set forth in claim 15, wherein the fuel injector also injects fuel onto the other of the valves in at least one of its positions.

32. An induction system for an internal combustion engine as set forth in claim 31, wherein the fuel injector injects fuel onto the other valve in all of its positions.

33. An induction system for an internal combustion engine as set forth in claim 32, wherein the other valve comprises the throttle valve.

34. An induction system for an internal combustion engine as set forth in claim 1, wherein the fuel injector injects fuel into a vortex created by at least one of the valves in at least one of its positions.

35. An induction system for an internal combustion engine as set forth in claim 1, wherein said engine has a plurality of combustion chambers and a plurality of intake passages each of which serves at least one of said combustion chambers, a plurality of fuel injectors each mounted on a respective one of said intake passages for spraying fuel directly into said intake passages, said intake passages being formed by separate throttle bodies in which flow controlling throttle valves are supported, a fuel rail for supplying fuel to said fuel injectors, a pressure regulator carried at one end of said fuel rail and a fuel filter provided at the other end of said fuel rail.

36. An induction system for an internal combustion engine as set forth in claim 35, wherein the pressure regulator regulates the pressure in the fuel rail to be at a predetermined pressure above the average pressure in said intake passages.

37. An induction system for an internal combustion engine as set forth in claim 36, further including a throttle position sensor associated with a throttle valve shaft of one of the throttle bodies.

38. An induction system for an internal combustion engine as set forth in claim 37, wherein the one of the throttle bodies is at one end of the engine.

39. An induction system for an internal combustion engine as set forth in claim 38, wherein the engine has at least one overhead camshaft driven by a timing drive at one end of the engine.

40. An induction system for an internal combustion engine as set forth in claim 39, wherein the throttle position sensor at same end of the engine as the timing drive.

41. An induction system for an internal combustion engine as set forth in claim 39, wherein the throttle position sensor at opposite end of the engine from the timing drive.

42. An induction system for an internal combustion engine as set forth in claim 37, further including a control unit for engine management also mounted on the throttle bodies and which receives a signal from the throttle position sensor.

43. An induction system for an internal combustion engine as set forth in claim 42, further including a compensating circuit in the output from the throttle position sensor to the engine control unit for compensating for known variations in the output of said throttle position sensor.

44. An induction system for an internal combustion engine as set forth in claim 43, further including means for affixing the fuel rail to the fuel injectors and to the throttle bodies so as to provide a unitary assembly.

45. An induction system for an internal combustion engine as set forth in claim 1, wherein said engine has a plurality of combustion chambers and a plurality of intake passages each of which serves at least one of said combustion chambers, a plurality of fuel injectors each mounted on a respective one of said intake passages for spraying fuel directly into said intake passages, said intake passages being formed by separate throttle bodies in which flow controlling throttle valves are supported, and a throttle position sensor associated with a throttle valve shaft of one of said throttle bodies.

46. An induction system for an internal combustion engine as set forth in claim 45, wherein the one of the throttle bodies is at one end of the engine.

47. An induction system for an internal combustion engine as set forth in claim 46, wherein the engine has at least one overhead camshaft driven by a timing drive at one end of the engine.

48. An induction system for an internal combustion engine as set forth in claim 47, wherein the throttle position sensor at same end of the engine as the timing drive.

49. An induction system for an internal combustion engine as set forth in claim 47, wherein the throttle position sensor at opposite end of the engine from the timing drive.

50. An induction system for an internal combustion engine as set forth in claim 1, wherein said engine has a plurality of combustion chambers and a plurality of intake passages each of which serves at least one of said combustion chambers, a plurality of fuel injectors each mounted on a respective one of said intake passages for spraying fuel directly into said intake passages, said intake passages being formed by separate throttle bodies in which flow controlling throttle valves are supported, a fuel rail for supplying fuel to said fuel injectors, and means for affixing said fuel rail to said fuel injectors and to said throttle bodies so as to provide a unitary assembly.

51. An induction system for an internal combustion engine having at least a pair of relatively movable components that define a combustion chamber, said induction system supplying a charge to said combustion chamber, said induction system forming an intake passage in which a throttle valve is positioned, said intake passage communicating with said combustion chamber through an intake port, said throttle valve being positioned in close proximity to said intake port, a fuel injector for injecting fuel directly into said intake passage and a piston type buffer valve in said intake passage and which is opened by the flow therethrough for restricting the air flow upon sudden changes in position in said throttle valve so as to maintain a more uniform air fuel ratio under transient conditions.

52. An induction system for an internal combustion engine as set forth in claim 51, wherein the piston type buffer valve is controlled by a diaphragm motor.

53. An induction system for an internal combustion engine as set forth in claim 52, wherein the diaphragm motor is operated by differential pressure in said induction system.

54. An induction system for an internal combustion engine as set forth in claim 53, wherein the differential pressure comprises atmospheric pressure and pressure in the intake passage contiguous to the buffer valve.

55. An induction system for an internal combustion engine as set forth in claim 54, wherein said induction system includes a filter element and the atmospheric pressure is sensed downstream of said filter element.

56. An induction system for an internal combustion engine as set forth in claim 53, wherein the differential pressure comprises atmospheric pressure and pressure in the intake passage contiguous to the point where the fuel is injected.

57. An induction system for an internal combustion engine as set forth in claim 51, wherein the sliding piston type valve extends at varying distances into the intake passage.

58. An induction system for an internal combustion engine as set forth in claim 57, wherein the fuel injector injects fuel onto at least one of the valves in at least one of its positions.

59. An induction system for an internal combustion engine as set forth in claim 58, wherein the fuel injector injects fuel onto the at least one of the valves in at substantially all of its positions.

60. An induction system for an internal combustion engine as set forth in claim 58, wherein the at least one of the valves is a butterfly type valve having a valve shaft extending across the intake passage.

61. An induction system for an internal combustion engine as set forth in claim 60, wherein the fuel injector injects fuel onto the upstream side of the butterfly type valve when it is in a closed position.

62. An induction system for an internal combustion engine as set forth in claim 60, wherein the fuel injector injects fuel onto the downstream side of the butterfly type valve when it is in an open position.

63. An induction system for an internal combustion engine as set forth in claim 62, wherein the fuel injector also injects fuel onto the upstream side of the butterfly type valve when it is in a closed position.

64. An induction system for an internal combustion engine as set forth in claim 63, wherein the butterfly type valve comprises the throttle valve.

65. An induction system for an internal combustion engine as set forth in claim 58, wherein the fuel injector sprays on the end of the sliding piston type valve.

66. An induction system for an internal combustion engine as set forth in claim 65, wherein the fuel injector sprays on the end of the sliding piston type valve in all positions thereof.

67. An induction system for an internal combustion engine as set forth in claim 66, wherein the fuel injector sprays on a needle like projection formed on the end of the sliding piston type valve.

68. An induction system for an internal combustion engine as set forth in claim 58, wherein the fuel injector sprays on the upstream side of the sliding piston type valve.

69. An induction system for an internal combustion engine as set forth in claim 68, wherein the fuel injector sprays on the upstream side of the sliding piston type valve when in a closed position and on the end thereof when in an opened position.

70. An induction system for an internal combustion engine as set forth in claim 58, wherein the fuel injector sprays on the downstream side of the sliding piston type valve.

71. An induction system for an internal combustion engine as set forth in claim 68, wherein the fuel injector sprays on the downstream side of the sliding piston type valve when in a closed position and on the end thereof when in an opened position.

72. An induction system for an internal combustion engine as set forth in claim 65, wherein the sliding piston type valve comprises the buffer valve.

* * * * *